US012647574B2

(12) United States Patent
Wang et al.

(10) Patent No.: US 12,647,574 B2
(45) Date of Patent: Jun. 2, 2026

(54) VIDEO IMAGE DECODING METHOD AND CODING METHOD, APPARATUS, AND STORAGE MEDIUM

(71) Applicant: Hangzhou Hikvision Digital Technology Co., Ltd., Hangzhou (CN)

(72) Inventors: Yan Wang, Hangzhou (CN); Yucheng Sun, Hangzhou (CN); Fangdong Chen, Hangzhou (CN); Xiaoyang Wu, Hangzhou (CN)

(73) Assignee: Hangzhou Hikvision Digital Technology Co., Ltd., Hangzhou (CN)

( * ) Notice: Subject to any disclaimer, the term of this patent is extended or adjusted under 35 U.S.C. 154(b) by 0 days.

(21) Appl. No.: 18/998,363

(22) PCT Filed: Jun. 30, 2023

(86) PCT No.: PCT/CN2023/105398
§ 371 (c)(1),
(2) Date: Jan. 24, 2025

(87) PCT Pub. No.: WO2024/022039
PCT Pub. Date: Feb. 1, 2024

(65) Prior Publication Data
US 2025/0337915 A1 Oct. 30, 2025

(30) Foreign Application Priority Data
Jul. 26, 2022 (CN) .......................... 202210887907.9

(51) Int. Cl.
*H04N 19/14* (2014.01)
*H04N 19/126* (2014.01)
*H04N 19/176* (2014.01)

(52) U.S. Cl.
CPC ........... *H04N 19/14* (2014.11); *H04N 19/126* (2014.11); *H04N 19/176* (2014.11)

(58) Field of Classification Search
None
See application file for complete search history.

(56) References Cited

U.S. PATENT DOCUMENTS

2005/0180502 A1 8/2005 Puri
2006/0233236 A1 10/2006 Labrozzi et al.
(Continued)

FOREIGN PATENT DOCUMENTS

CN 110740324 A 1/2020
CN 111866504 A 10/2020
(Continued)

*Primary Examiner* — Nam D Pham
(74) *Attorney, Agent, or Firm* — Bret E. Field; Bozicevic, Field & Francis LLP

(57) ABSTRACT

The present application relates to the technical field of video decoding. Provided in the embodiments of the present application are a video image decoding method and coding method, an apparatus, and a storage medium, which help to improving the image quality. The method comprises: acquiring channel-level complexity levels from a data stream, the data stream being a coding data stream of a current block; according to at least two channel-level complexity levels, determining the block-level complexity level of the current block, the channel-level complexity levels being used for representing the complexity degree of the channel-level texture of the current block; according to a code control parameter, determining a target bit number of the current block, the code control parameter comprising the block-level complexity level of the current block; on the basis of the target bit number, determining a quantization parameter of the current block; and on the basis of the quantization parameter, decoding the current block.

18 Claims, 4 Drawing Sheets

(56)     References Cited

U.S. PATENT DOCUMENTS

| | | | |
|---|---|---|---|
| 2008/0304562 A1 | 12/2008 | Chang et al. | |
| 2016/0150229 A1* | 5/2016 | Jun | .................... H04N 19/172<br>375/240.03 |

FOREIGN PATENT DOCUMENTS

| | | | |
|---|---|---|---|
| CN | 113099067 A | 7/2021 |
| CN | 113784126 A | 12/2021 |
| CN | 114466189 A | 5/2022 |
| CN | 116095319 A | 5/2023 |
| JP | H10224786 A | 8/1998 |
| JP | 2011259408 A | 12/2011 |
| JP | 2015115735 A | 6/2015 |
| KR | 20090006080 A | 1/2009 |
| KR | 20170137076 A | 12/2017 |
| WO | WO2019191983 A1 | 10/2019 |

* cited by examiner

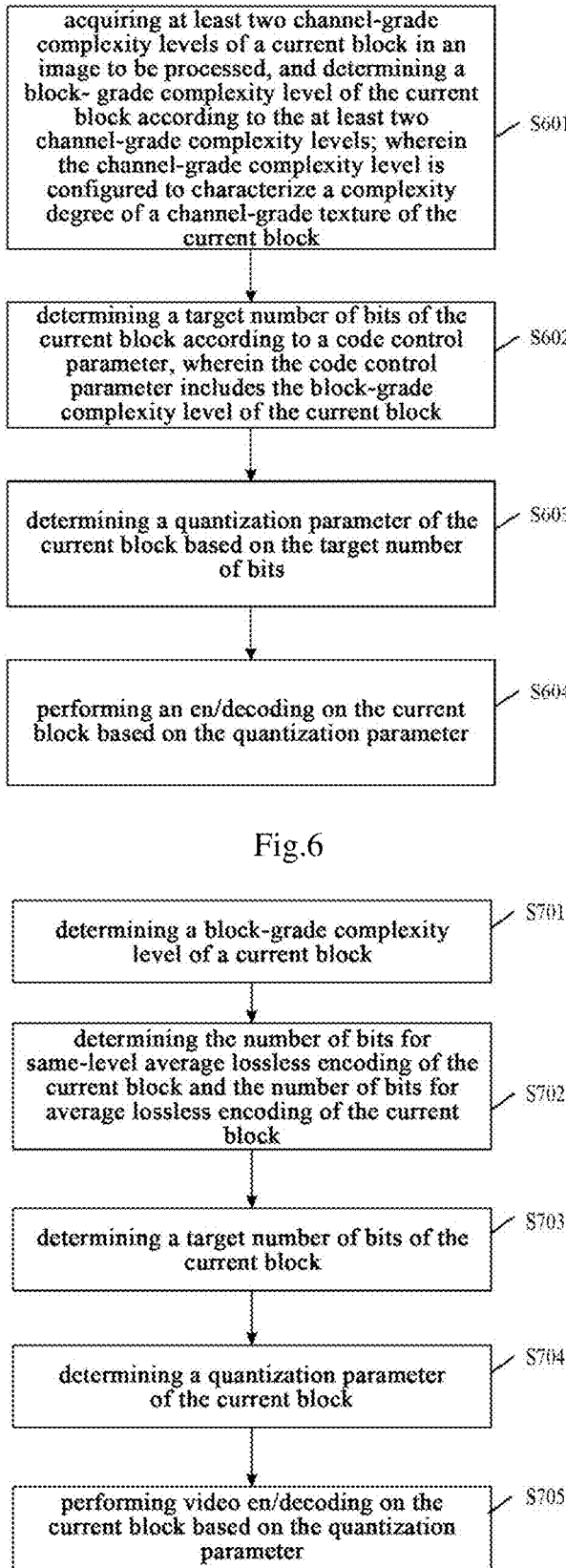

acquiring at least two channel-grade complexity levels of a current block in an image to be processed, and determining a block- grade complexity level of the current block according to the at least two channel-grade complexity levels; wherein the channel-grade complexity level is configured to characterize a complexity degree of a channel-grade texture of the current block — S601 determining a target number of bits of the current block according to a code control parameter, wherein the code control parameter includes the block-grade complexity level of the current block — S602 determining a quantization parameter of the current block based on the target number of bits — S603 performing an en/decoding on the current block based on the quantization parameter — S604

Fig.6 determining a block-grade complexity level of a current block — S701 determining the number of bits for same-level average lossless encoding of the current block and the number of bits for average lossless encoding of the current block — S702 determining a target number of bits of the current block — S703 determining a quantization parameter of the current block — S704 performing video en/decoding on the current block based on the quantization parameter — S705

Fig.7

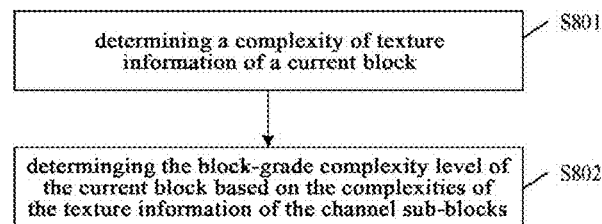

determining a complexity of texture
information of a current block — S801 determinging the block-grade complexity level of
the current block based on the complexities of
the texture information of the channel sub-blocks — S802

Fig.8

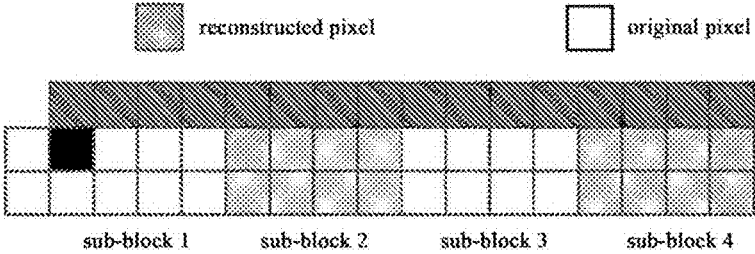

☒ reconstructed pixel        ☐ original pixel sub-block 1    sub-block 2    sub-block 3    sub-block 4

Fig.9

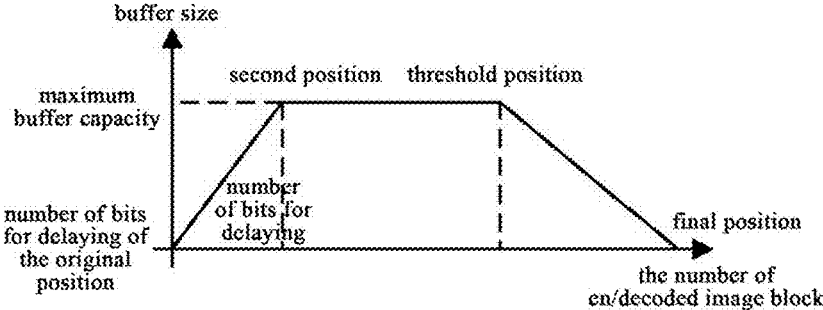

buffer size maximum
buffer capacity second position    threshold position number
of bits for
delaying number of bits
for delaying of
the original
position final position the number of
en/decoded image block

Fig.10

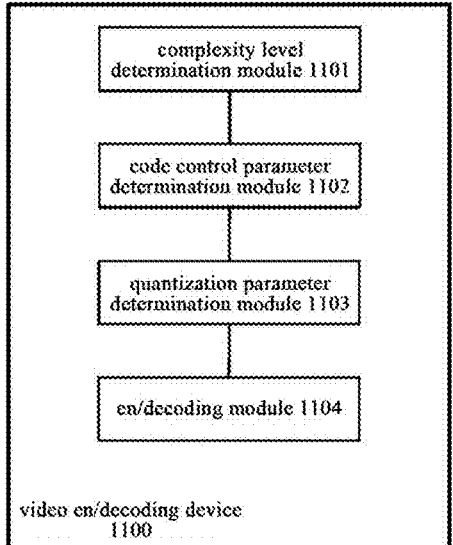

complexity level
determination module 1101 code control parameter
determination module 1102 quantization parameter
determination module 1103 en/decoding module 1104 video en/decoding device
1100

Fig. 11

VIDEO IMAGE DECODING METHOD AND CODING METHOD, APPARATUS, AND STORAGE MEDIUM

RELATED APPLICATION

The present application claims the priority to Chinese Patent Application No. 202210887907.9 filed with the China National Intellectual Property Administration on Jul. 26, 2022, which is incorporated herein by reference in its entirety.

TECHNICAL FIELD

The present application relates to the technical field of video en/decoding, and in particular to a video image decoding method, encoding method, device and a storage medium.

BACKGROUND

A video en/decoding technology plays an important role in the field of video processing. The video en/decoding technology is a technology for reducing the amount of video data by encoding or decoding the video. Wherein, quantization is an important step in the above process of video encoding and decoding, which achieves a reduction of redundancy of original data in a code stream mainly by replacing part of the original data in the code stream with a quantization parameter. The quantization parameter configured for quantization is written into the code stream during a video encoding stage. A video decoding end implements decoding by parsing the quantization parameter in the code stream. However, the quantization will brings a risk of image distortion, so selecting an appropriate quantization parameter can improve the image quality. Therefore, how to select a quantization parameter has become a key to the video en/decoding technology.

SUMMARY

Embodiments of the present application provide a video image decoding method, encoding method, device and a storage medium, which help to improve the image quality of video en/decoding and improve a visual experience.

To achieve the above purpose, embodiments of the present application adopt following technical solutions:

In a first aspect, an embodiment of the present application provides a video image decoding method or encoding method, which is applied to a chip of a video encoding device or a video decoding device or a video encoding and decoding device, and the method includes: acquiring channel-grade complexity levels from a code stream, wherein the code stream is an encoded code stream of a current block, and determining a block-grade complexity level of the current block according to at least two of the channel-grade complexity levels: wherein the channel-grade complexity level is determined by a complexity degree of a channel-grade texture of the current block; determining a target number of bits of the current block according to a code control parameter, wherein the code control parameter includes the block-grade complexity level of the current block; determining a quantization parameter of the current block based on the target number of bits: performing decoding on the current block based on the quantization parameter.

The above quantization parameter plays an important role in the process of video encoding and decoding. By using the video image decoding method or encoding method proposed by the present application, the video en/decoding device acquires the channel-grade complexity levels from the code stream, and determines the block-grade complexity level of the current block based on at least two of the channel-grade complexity levels, determines the target number of bits of the current block according to the code control parameter including the block-grade complexity level, and further determines the quantization parameter of the current block based on the target number of bits. Based on the above process, the video image decoding method or encoding method provided by the present application can optimize the selection of the quantization parameter, improve the image quality of the video en/decoding, and improve the visual experience.

In one possible implementation, the above code control parameter includes the number of bits for same-level average lossless encoding, the number of bits for average lossless encoding, and a buffer fullness of the code stream:

determining the target number of bits of the current block according to the code control parameter includes: determining the number of bits for same-level average lossless encoding and the number of bits for average lossless encoding; determining an initial target number of bits based on the number of bits for same-level average lossless encoding and the number of bits for average lossless encoding; determining the target number of bits of the current block based on the buffer fullness of the code stream, the block-grade complexity level of the current block, and the initial target number of bits: wherein, the number of bits for same-level average lossless encoding is an average value of predicted values of the numbers of bits required for lossless encoding of the current block and multiple en/decoded image blocks, and the multiple en/decoded image blocks have same complexity levels as that of the current block: the number of bits for average lossless encoding is an average value of predicted values of the numbers of bits required for lossless encoding of the current block and all of the en/decoded image blocks: the buffer fullness of the code stream is configured to characterize a fullness of a buffer, and the buffer is configured to store a code stream of an image to be processed.

In this possible implementation, a method for determining the target number of bits of the current block is provided. Determining the initial target number of bits by introducing the number of bits for same-level average lossless encoding and the number of bits for average lossless encoding, and determining the target number of bits of the current block based on the initial target number of bits, the buffer fullness of the code stream and the block-grade complexity level, can achieve that the determination of the quantization parameter is more accurately, thereby achieving the effect of improving image quality while ensuring en/decoding efficiency.

In one possible implementation, determining the number of bits for same-level average lossless encoding and the number of bits for average lossless encoding includes: determining the number of bits for lossless encoding of the current block, wherein the number of bits for lossless encoding is a predicted value of the number of bits required for lossless coding of the current block; updating the number of bits for same-level average lossless encoding of the current block according to the number of bits for lossless encoding of the current block and multiple historical numbers of bits for same-level average lossless encoding: wherein the historical number of bits for same-level average lossless encoding is the number of bits for same-level average lossless encoding of the en/decoded image block with the same block-grade complexity level as that of the current block; updating the number of bits for average lossless encoding of the current block according to the number of bits for lossless encoding of the current block and all of the historical numbers of bits for average lossless encoding: wherein the historical number of bits for average lossless encoding is the number of bits for average lossless encoding of the en/decoded image block.

In this possible implementation, a method for determining the number of bits for same-level average lossless encoding and the number of bits for average lossless encoding through the number of bits for lossless encoding of the current block, the historical number of bits for same-level average lossless encoding and the historical number of bits for average lossless encoding is provided, which helps to improve the feasibility of the solution. By corresponding the number of bits for same-level average lossless encoding to the block-grade complexity level, the selection of quantization parameters can be optimized, thereby improving the image quality.

In one possible implementation, the current block is a first-row block of the image to be processed, and the code control parameter includes a first-row quality improvement parameter; determining the target number of bits of the current block according to the code control parameter further includes: adjusting the target number of bits of the current block according to the first-row quality improvement parameter to reduce the quantization parameter of the current block.

In this possible implementation, another method for determining the target number of bits of the current block is provided, which is applicable to a scenario where the current block is the first-row block. When the current block is the first-row block, the prediction is difficult because the prediction error is transitive. In this implementation, the above influence is reduced by introducing the first-row quality improvement parameter to reduce the quantization parameter of the first-row block, so that the effect of improving the image quality of video en/decoding is achieved.

In one possible implementation, the current block is a first-column block of the image to be processed, and the code control parameter includes a first-column quality improvement parameter; determining the target number of bits of the current block according to the code control parameter further includes: adjusting the target number of bits of the current block according to the first-row quality improvement parameter to reduce the quantization parameter of the current block.

In this possible implementation, another method for determining the target number of bits of the current block is provided, which is applicable to a scenario where the current block is the first-column block. When the current block is the first-column block, the prediction is difficult because the prediction error is transitive. In this implementation, the above influence is reduced by introducing the first-column quality improvement parameter to reduce the quantization parameter of the first-column block, so that the effect of improving the image quality of video en/decoding is achieved.

In one possible implementation, acquiring the channel-grade complexity level from the code stream includes: acquiring a complexity information bit of the current block from the code stream, wherein the complexity information bit is configured to indicate a channel-grade complexity level of the current block; and determining the channel-grade complexity levels according to the complexity information bit.

In this possible implementation, a method of acquiring the above channel-grade complexity level by a decoding end is provided. The above channel-grade complexity level is acquired through parsing an information bit in the encoded code stream indicating the channel-grade complexity level of the current block. In one possible scenario, the complexity information bit can be 1-bit or 3-bit, and the first bit of the complexity information bit is configured to indicate whether the current channel-grade complexity level is the same as a complexity level of the same channel of a previous image block of the current block and a differential value between the two complexity levels. Taking a YUV image as an example, if the current channel-grade complexity level is a complexity level of a U channel of the current block, a complexity of a same channel of a previous image block represents a complexity level of a U channel of an image block being decoded previous to the current block. If the complexity levels are determined to be the same according to the first bit, the complexity information bit is 1-bit; if they are determined to be different, the complexity information bit is 3-bit, and the last two bits represent a differential value between the channel-grade complexity of the current block and the complexity level of the same channel of the previous image block to the current block. Based on the differential value and the complexity level of the same channel of the previous image block, the current channel-grade complexity level being required can be determined. It is understandable that the above scenario is only for illustrative purposes, and the protection scope of this possible implementation is not limited to this, in addition, feasibility of the solution is improved by a specific method of acquiring the channel-grade complexity level by the decoding end.

In a second aspect, an embodiment of the present application provides a video image encoding method, which is applied to a chip of a video encoding device, and the method includes: acquiring channel-grade texture information of a current block, and determining channel-grade complexity levels of the current block based on the channel-grade texture information, and determining a block-grade complexity level of the current block according to at least two of the channel-grade complexity levels: wherein the channel-grade complexity level is determined by a complexity degree of a channel-grade texture of the current block; determining a target number of bits of the current block according to a code control parameter, wherein the code control parameter includes the block-grade complexity level of the current block; determining a quantization parameter of the current block based on the target number of bits: performing encoding on the current block based on the quantization parameter.

In this possible implementation, a method for acquiring the channel-grade complexity level of the current block is provided. At the encoding end, the channel-grade complexity level of the current block is determined based on the channel-grade texture information of the current block, and at the decoding end, the channel-grade complexity level of the current block is acquired from the received encoded code stream. By providing the method for acquiring the channel-grade complexity level of the current block in encoding and decoding, the feasibility of the solution is improved, and it is convenient to subsequently determine other code control parameters and target number of bits based on the obtained channel-grade complexity level, thereby optimizing the quantization parameter.

In one possible implementation, acquiring the channel-grade texture information of the current block, and determining the channel-grade complexity levels of the current block based on the channel-grade texture information includes: taking at least one channel image block of the current block as a processing unit, and dividing the processing unit into at least two sub-units, and determining texture information of each of the sub-units; determining, in the processing unit, the block-grade complexity level of the current block based on the texture information of sub-units.

In this possible implementation, a method applicable to the encoding end for determining the channel-grade complexity level of the current block is provided, which improves the feasibility of the solution. Wherein, the at least one channel image block of the current block is taken as one processing unit, and each processing unit is further divided into at least two sub-units, which helps to improve the accuracy of the complexity information.

In one possible implementation, determining the texture information of each of the sub-units includes: acquiring original pixel values of the sub-unit, original pixel values or reconstructed values of an adjacent left column to the sub-unit, and reconstructed values of an adjacent upper row to the sub-unit, and calculating horizontal texture information and vertical texture information of the sub-unit respectively; selecting a minimum value from the horizontal texture information and the vertical texture information as the texture information of the sub-unit to which the horizontal texture information and the vertical texture information correspond.

In this possible implementation, an implementation for determining the texture information of the sub-unit is provided, which improves the feasibility of the solution.

In one possible implementation, determining, in the processing unit, the block-grade complexity level of the current block based on the texture information of the sub-units includes: classifying, in the processing unit, the texture information of each of the sub-units into a corresponding one of sub-unit complexity levels based on multiple thresholds, wherein the multiple thresholds are preset; determining the block-grade complexity level of the current block based on the sub-unit complexity levels.

In this possible implementation, it is proposed to classify the texture information of each of the sub-units into the corresponding one of sub-unit complexity levels by setting the multiple thresholds, and determine the block-grade complexity level of the current block based on the sub-unit complexity levels, which helps to improve the feasibility of the solution.

In one possible implementation, determining the block-grade complexity level of the current block based on the sub-unit complexity levels includes: mapping each of the sub-unit complexity levels to a corresponding one of the channel-grade complexity levels according to a preset rule; determining the block-grade complexity level of the current block based on all of the channel-grade complexity levels.

In this possible implementation, a method for mapping each of the sub-unit complexity levels to the corresponding one of the channel-grade complexity levels and further determining the block-grade complexity level of the current block based on the channel-grade complexity levels of the current block is proposed, which helps to improve the feasibility of the solution.

In one possible implementation, mapping each of the sub-unit complexity levels to the corresponding one of the channel-grade complexity levels according to the preset rule includes: determining the channel-grade complexity level based on multiple thresholds and a sum of the sub-unit complexity levels, wherein the multiple thresholds are preset.

In this possible implementation, a method for determining the channel-grade complexity level based on the multiple thresholds and the sum of the sub-unit complexity levels is provided, which helps to improve the feasibility of the solution.

In one possible implementation, mapping each of the sub-unit complexity levels to the corresponding one of the channel-grade complexity levels according to the preset rule includes: determining an order composition of the sub-unit complexity level, and determining the corresponding one of the channel-grade complexity levels according to the order composition.

In this possible implementation, a method for determining the corresponding one of the channel-grade complexity levels based on the order composition of the sub-unit complexity level is provided, which helps to improve the feasibility of the solution.

In one possible implementation, determining the block-grade complexity level of the current block based on all of the channel-grade complexity levels includes: taking a maximum value, a minimum value or a weighted value of channel-grade complexity levels as the block-grade complexity level of the current block; or, determining the block-grade complexity level of the current block based on multiple thresholds and the sum of channel-grade complexity levels, wherein the multiple thresholds are preset.

In this possible implementation, two methods for determining the block-grade complexity level of the current block based on channel-grade complexity levels are provided, which helps to improve the feasibility of the solution.

In one possible implementation, the current block is a multi-channel image block; channel components of the multi-channel image block jointly or independently determine the number of bits for same-level lossless encoding and the target number of bits.

In this possible implementation, it is proposed that the channel components of the multi-channel image block jointly or independently determine the number of bits for same-level lossless encoding and target number of bits, which helps to improve the feasibility of the solution.

In one possible implementation, the above current block is a multi-channel image block; channel components of the multi-channel image block jointly or independently determine the channel-grade complexity level.

In this possible implementation, it is proposed that the channel components of the multi-channel image block jointly or independently determine the channel-grade complexity level, which helps to improve the feasibility of the solution.

In a third aspect, an embodiment of the present application provides a video en/decoding device, which has the function of realizing any one of the video image encoding methods or decoding methods in the above first or second aspect. This function can be realized by hardware or by corresponding software executed on the hardware. The hardware or software includes one or more modules corresponding to the above functions.

In a fourth aspect, a video encoder is provided, which includes a processor and a memory; wherein the memory is configured to store computer-executed instructions, and when the video encoder runs, the processor executes the computer-executed instructions stored in the memory, so that the video encoder can perform any one of the video image encoding methods or decoding methods in the above first or second aspect.

In a fifth aspect, a video decoder is provided, which includes a processor and a memory; wherein the memory is configured to store computer-executed instructions, and when the video decoder runs, the processor executes the computer-executed instructions stored in the memory, so that the video decoder can perform any one of the video image encoding methods or decoding methods in the above first or second aspect.

In a sixth aspect, a computer-readable storage medium is provided, which stores instructions thereon, which, when run on a computer, cause the computer to carry out any one of the video image encoding methods or decoding methods in the above first or second aspect.

In a seventh aspect, a computer program product including instructions is provided, which, when run on a computer, cause the computer to carry out any one of the video decoding methods in the above first aspect.

In a eighth aspect, an electronic apparatus is provided, which includes a video en/decoding device, and a processing circuit is configured to perform any one of the video image encoding methods or decoding methods in the above first or second aspect.

In an ninth aspect, a chip is provided, which includes a processor, wherein the processor is coupled with a memory, and the memory stores program instructions therein, and when the program instructions stored in the memory are executed by the processor, any one of the video image encoding methods or decoding methods in the above first or second aspect is realized.

In a tenth aspect, a video encoding and decoding system is provided, which includes a video encoder configured to perform any one of the video image encoding methods or decoding methods in the above first or second aspect, and a video decoder configured to perform any one of the video image encoding methods or decoding methods in the above first or second aspect.

The technical effects brought by any of the implementations in the second to ninth aspects can refer to the technical effects brought by the corresponding implementations in the first aspect, and will not be repeated here.

BRIEF DESCRIPTION OF THE DRAWINGS

FIG. 6 is a flowchart of a video image decoding method or encoding method provided by an embodiment of the present application;

FIG. 7 is a flowchart of a specific embodiment of a video image decoding method or encoding method provided by an embodiment of the present application;

FIG. 8 is a flowchart for determining a block-grade complexity level in a video image decoding method or encoding method provided by an embodiment of the present application;

FIG. 9 is a schematic diagram of texture information of sub-blocks in a specific embodiment of a video image decoding method or encoding method provided by an embodiment of the present application;

FIG. 10 is a schematic diagram of an initial delay transmission mechanism in a video image decoding method or encoding method provided by an embodiment of the present application;

FIG. 11 is a schematic diagram of a video en/decoding device provided by an embodiment of the present application.

DETAILED DESCRIPTION

Figure 1:
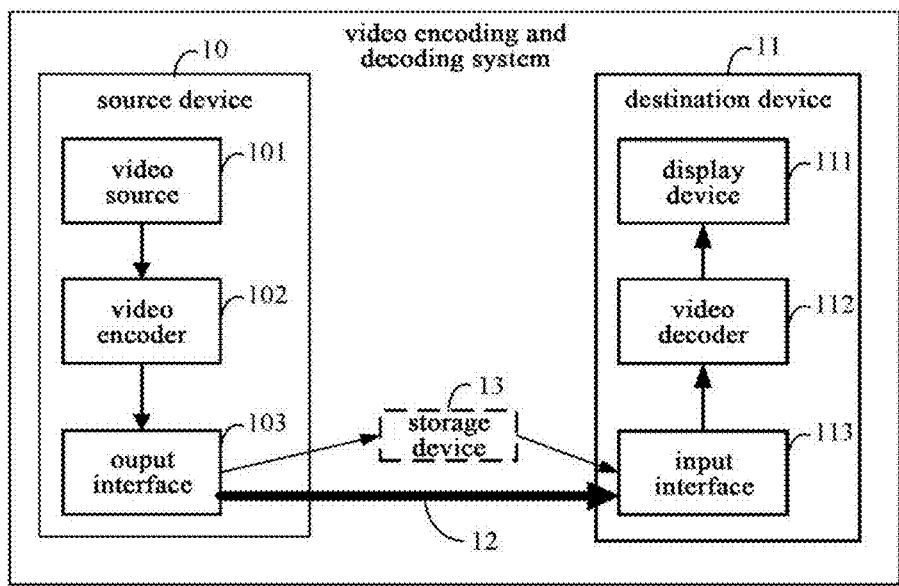
FIG. 1 is a system architecture diagram of an encoding and decoding system provided by an embodiment of the present application.

In the description of the present application, unless otherwise specified, "/" means "or", for example, A/B may mean A or B. In this paper, "and/or" is only a kind of relationship that describes the related objects, indicating that there may be three kinds of relationships, for example, A and/or B, which may mean that A exists alone, both A and B exist, and B exists alone. In addition, "at least one" means one or more, and "multiple" means two or more. The words "first" and "second" do not limit the quantity and execution order, and the words "first" and "second" do not necessarily mean difference.

It should be noted that in the present application, the words "exemplary" or "for example" are configured to indicate an example, illustration or explanation. Any embodiment or design solution described as "exemplary" or "for example" in the present application should not be interpreted as being preferred or advantageous over other embodiments or design solutions. Specifically, the use of words such as "exemplary" or "for example" aims to present a related concept in a specific way.

First, the technical terms involved in the embodiments of the present application are introduced:

1. Video En/Decoding Technology

Video en/decoding technology includes video encoding technology and video decoding technology, which can also be collectively referred to as video coding and decoding technology.

The video sequence has a series of redundant information such as spatial redundancy, temporal redundancy, visual redundancy, information entropy redundancy, structural redundancy, knowledge redundancy and importance redundancy, and so on. In order to remove as much redundant information from the video sequence as possible and reduce the amount of data characterizing the video, the video encoding technology is proposed, to achieve the effect of reducing storage space and saving transmission bandwidth. Video encoding technology is also called video compression technology.

In order to acquire data stored or transmitted based on the above video compression technology, video decoding technology is required accordingly.

Within the international scope, a video compression encoding standard is configured to standardize video encoding and decoding methods, such as Advanced Video Coding (AVC) in Part 10 of MPEG-2 and MPEG-4 standards formulated by Motion Picture Experts Group (MPEG), and H.263, H.264 and H.265 (also called High Efficiency Video Coding Standard (HEVC)) formulated by the International Telecommunication Union-Telecommunication Standardization Sector (ITU-T).

It should be noted that in an encoding algorithm based on hybrid encoding architecture, the above compression encoding methods can be configured in a mixed manner.

The basic processing unit in the video encoding and decoding process is an image block, which is obtained by dividing a frame/an image by the encoding end. The image blocks after division are usually processed row by row and one by one. Wherein, an image block being processed is called a current block, and an image block that has been processed is called an encoded image block, or a decoded image block, or an en/decoded image block. Taking HEVC as an example, HEVC defines Coding Tree Unit (CTU), Coding Unit (CU), Prediction Unit (PU) and Transform Unit (TU). Any of the CTU, CU, PU and TU can be configured as an image block after division. Wherein, the CU is based for division for both PU and TU.

2. Video Sampling

A pixel is the smallest complete sample of a video or an image. Therefore, the data processing of an image block is done in unit of pixels. Wherein, each pixel records color information. One way of sampling is to represent colors by RGB, which includes three image channels, wherein R represents red, G represents green, and B represents blue. Another way of sampling is to represent color by YUV, which includes three image channels, wherein Y represents luminance, U represents first chrominance Cb, and V represents second chrominance Cr. Since humans are more sensitive to luminance than to chrominance, the storage space can be reduced by storing more luminance and less chrominance. Specifically, in video encoding and decoding, YUV format is typically configured for video sampling, which includes 420 sampling format, 422 sampling format, etc. The sampling format determines the sampling number of two chrominances based on the sampling number of luminance. For example, assuming a CU has 4×2 pixels, in the following format:

[Y0, U0, V0] [Y1, U1, V1] [Y2, U2, V2] [Y3, U3, V3];
[Y4, U4, V4] [Y5, U5, V5] [Y6, U6, V6] [Y7, U7, V7];

The 420 sampling format indicates that the YUV is sampled in a format of 4:2:0, that is, the luminance and the first chrominance or the second chrominance are selected in a ratio of 4:2, wherein the first chrominance and the second chrominance are selected in alternate rows. Then the above CU sampling selects the luminance Y0-Y3 in the first row and the first chrominance U0 and U2, and selects the luminance Y4-Y7 in the second row and the second chrominance V4 and V6. The sampled CU consists of a luminance encoding unit and a chrominance encoding unit, wherein the luminance encoding unit is:

[Y0] [Y1] [Y2] [Y3];
[Y4] [Y5] [Y6] [Y7];
the first chrominance encoding unit is:
[U0] [U2];
the second chrominance encoding unit is:
[V4] [V6];

It can be seen that the size of the image block after being sampled in the above sampling format has changed. The size of the luminance encoding unit block remains unchanged at 4×2, while the size of the first chrominance encoding unit block changes to 2×1 and the size of the second chrominance encoding unit block also changes to 2×1. Therefore, if the size of CU is assumed to be X×Y, the size of chrominance encoding unit block after being sampled based on a 420 sampling format is $$\frac{X}{2} \times \frac{Y}{2}.$$

Similarly, the 422 sampling format indicates that YUV is sampled in a format of 4:2:2, that is, the luminance, the first chrominance and the second chrominance are selected in a ratio of 4:2:2. Then the sampled luminance encoding unit of the CU is:

[Y0] [Y1] [Y2] [Y3];
[Y4] [Y5] [Y6] [Y7];
the first chrominance encoding unit is:
[U0] [U2];
[U4] [U6];
the second chrominance encoding unit is:
[V1] [V3];
[V5] [V7];

wherein, the size of the luminance encoding unit block remains unchanged at 4×2, while the size of the first chrominance encoding unit block changes to 2×2 and the size of the second chrominance encoding unit block also changes to 2×2. Therefore, if the size of CU is assumed to be X×Y, the size of chrominance encoding unit block after being sampled based on a 422 sampling format is $$\frac{X}{2} \times Y.$$

The luminance encoding unit, the first chrominance encoding unit and the second chrominance encoding unit obtained by sampling as described above are configured as data units of each channel for subsequent processing of the current block.

The en/decoding method provided by the present application is applicable to a video encoding and decoding system. The video encoding and decoding system can also be referred to as video en/decoding system. FIG. 1 shows the structure of the video encoding and decoding system.

As shown in FIG. 1, a video encoding and decoding system includes a source device 10 and a destination device 11. The source device 10 generates encoded video data, the source device 10 can also be referred to as a video encoding device or a video encoding apparatus, and the destination device 11 can decode the encoded video data generated by the source device 10, the destination device 11 can also be referred to as a video decoding device or a video decoding apparatus. The source device 10 and/or the destination device 11 may include at least one processor and a memory coupled to the at least one processor. The above memory may include, but is not limited to, a Read-Only Memory (ROM), a Random Access Memory (RAM), an Electrically Erasable Programmable Read-Only Memory (EEPROM), a flash memory, or any other medium that can be configured to store the desired program code in the form of instructions or data structures accessible by a computer, which is not specifically limited in the present application.

The source device 10 and the destination device 11 may include various devices, including desktop computers, mobile computing devices, notebook (e.g., laptop) computers, tablet computers, set-top boxes, telephone handsets such as so-called "smart" phones, televisions, cameras, display devices, digital media players, video game consoles, vehicle-mounted computers or the similar electronic apparatuses.

The destination device 11 may receive encoded video data from the source device 10 via a link 12. The link 12 may include one or more media and/or devices capable of moving encoded video data from the source device 10 to the destination device 11. In one instance, the link 12 may include one or more communication media that enable the source device 10 to directly transmit the encoded video data to the destination device 11 in real time. In this instance, the source device 10 may modulate the encoded video data according to a communication standard (e.g., a wireless communication protocol) and may transmit the modulated video data to the destination device 11. The above one or more communication media may include a wireless and/or wired communication media, such as a Radio Frequency (RF) spectrum and one or more physical transmission lines. The above one or more communication media may form a part of packet-based network, such as local area network, wide area network or global network (e.g., the Internet). The above one or more communication media may include routers, switches, base stations, or other apparatuses that enable communication from the source device 10 to the destination device 11.

In another instance, the encoded video data may be output from the output interface 103 to the storage device 13. Similarly, the encoded video data can be accessed from the storage device 13 via the input interface 113. The storage device 13 may include various locally accessible data storage media, such as a Blu-ray Disc, a Digital Video Disc (DVD), a Compact Disc Read-Only Memory (CD-ROM), a flash memory, or other suitable digital storage media for storing encoded video data.

In another instance, the storage device 13 may correspond to a file server or another intermediate storage device that stores the encoded video data generated by the source device 10. In this instance, the destination device 11 can acquire, from the storage device 13, the video data stored therein through streaming or downloading. The file server may be any type of server capable of storing encoded video data and transmitting the encoded video data to the destination device 11. For example, a file server may include a World Wide Web (Web) server (for example, for a website), a File Transfer Protocol (FTP) server, a Network Attached Storage (NAS) device, and a local disk drive.

The destination device 11 can access the encoded video data via any standard data connection (for example, Internet connection). The type of data connection instances includes wireless channels, wired connections (e.g., cable modems, etc.), or a combination of both, which are suitable for accessing encoded video data stored on a file server. The encoded video data can be transmitted from the file server by streaming, downloading or a combination of both.

The en/decoding method of the present application is not limited to wireless application scenarios. For example, the en/decoding method of the present application can be applied to video encoding and decoding that supports a variety of multimedia applications as follows: over-the-air television broadcasting, cable television transmissions, satellite television transmissions, streaming video transmissions (for example, via the Internet), encoding of video data stored on a data storage media, decoding of video data stored on the data storage media, or other applications. In some instances, the video encoding and decoding system can be configured to support unidirectional or bidirectional video transmission to support applications such as video streaming, video playing, video broadcasting and/or video telephony.

It should be noted that the video encoding and decoding system as shown in FIG. 1 is only an example of a video encoding and decoding system, and is not a limitation of the video encoding and decoding system in the present application. The en/decoding method provided by the present application can also be applicable to a scenario where there is no data communication between the encoding device and the decoding device. In other instances, the video data to be encoded or the encoded video data can be retrieved from local storage, or can be streamed on the network, and the like. The video encoding device can encode the video data to be encoded and store the encoded video data in the memory, and the video decoding device can also acquire the encoded video data from the memory and decode the same.

In FIG. 1, a source device 10 includes a video source 101, a video encoder 102 and an output interface 103. In some instances, the output interface 103 may include a modulator/demodulator (modem) and/or a transmitter. The video source 101 may include a video capture device (e.g., a camera), a video archive containing previously captured video data, a video input interface for receiving video data from a video content provider, and/or a computer graphics system for generating video data, or a combination of these sources of video data.

The video encoder 102 may encode video data from the video source 101. In some instances, the source device 10 directly transmits the encoded video data to the destination device 11 via the output interface 103. In other instances, the encoded video data can also be stored on the storage device 13 for later access by the destination device 11 for decoding and/or playing.

In the instance of FIG. 1, the destination device 11 includes a display device 111, a video decoder 112, and an input interface 113. In some instances, the input interface 113 includes a receiver and/or a modem. The input interface 113 may receive encoded video data via the link 12 and/or from the storage device 13. The display device 111 may be integrated with the destination device 11 or may be external to the destination device 11. Generally, the display device 111 displays the decoded video data. The display device 111 may include various display devices, for example, a liquid crystal display, a plasma display, an organic light emitting diode display, or other types of display devices.

Optionally, the video encoder 102 and the video decoder 112 may be respectively integrated with the audio encoder and decoder, and may include appropriate multiplexer-demultiplexer units or other hardware and software to handle the encoding of both audio and video in a common data stream or separate data streams.

The video encoder 102 and the video decoder 112 may include at least one microprocessor, a Digital Signal Processor (DSP), an Application-Specific Integrated Circuit (ASIC), a Field Programmable Gate Array (FPGA), discrete logic, hardware or any combination thereof. If the en/decoding method provided by the present application is implemented by software, the instructions for the software can be stored in a suitable nonvolatile computer-readable storage medium, and the instructions can be executed by at least one processor to implement the present application.

The video encoder 102 and the video decoder 112 in the present application can operate according to a video compression standard (for example, HEVC) or other industry standards, which is not specifically limited in the present application.

Figure 2:
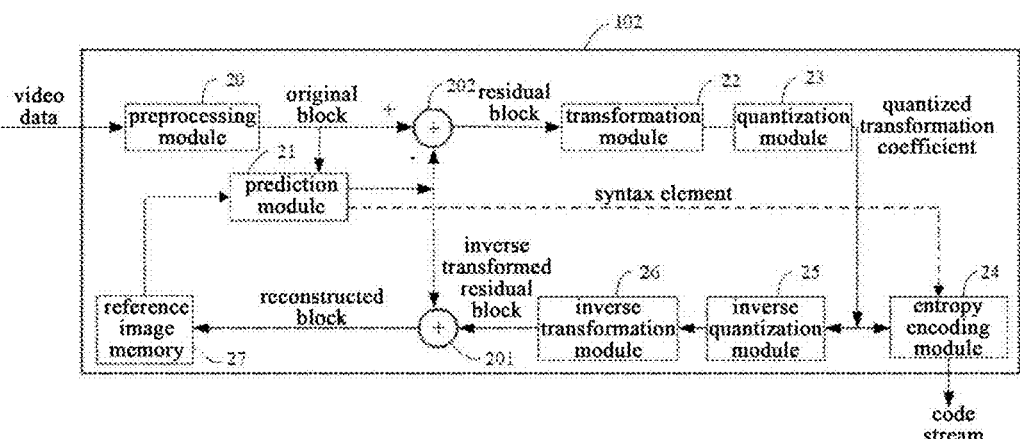
FIG. 2 is a schematic diagram of a structure of a video encoder provided by an embodiment of the present application.

FIG. 2 is a schematic block diagram of a video encoder 102 in an embodiment of the present application. The video encoder 102 can perform prediction, transformation, quantization and entropy encoding in a prediction module 21, a transformation module 22, a quantization module 23 and an entropy encoding module 24, respectively. The video encoder 102 also includes a preprocessing module 20 and a summator 202, wherein the preprocessing module 20 includes a partition module and a code rate control module. For video block reconstruction, the video encoder 102 also includes an inverse quantization module 25, an inverse transformation module 26, a summator 201 and a reference image memory 27.

As shown in FIG. 2, the video encoder 102 receives video data, and the preprocessing module 20 obtains input parameters of the video data. Wherein, the input parameters include a resolution of an image, a sampling format of the image, bits per pixel (bpp), bit width and other information in the video data. Wherein, bpp refers to the number of bits occupied by a pixel component in a unit pixel. Bit width refers to the number of bits occupied by a unit pixel. For example, a pixel is represented by the values of three pixel components in RGB. If each pixel component occupies 8 bits, the pixel depth of the pixel is 8, and the bit width of the pixel is 3×8=24 bits.

The partition module in the preprocessing module 20 partitions the image into original blocks. This partition may also include partition into slices, image blocks or other larger units, and (for example), video block partition according to the quadtree structure of CU and Largest encoding unit (LCU). Exemplarily, the video encoder 102 is an assembly for encoding video blocks in a video slice to be encoded. Generally, a slice can be divided into multiple original blocks (and can be divided into a set of original blocks called image blocks). The sizes of CUs, PUs and TUs are usually determined in the partition module. In addition, the partition module is also configured to determine the size of the code rate control unit. The code rate control unit refers to a basic processing unit in the code rate control module. For example, in the code rate control module, the complexity information is calculated for the current block, based on the code rate control unit, and then calculates the quantization parameter of the current block according to the complexity information. Wherein, the partition strategy of the partition module can be preset, or can be continuously adjusted based on an image during the encoding process. When the partition strategy is a preset strategy, the same partition strategy is also preset in the decoding end accordingly, so as to acquire the same image processing unit. The image processing unit is any one of the above image blocks, and corresponds to the encoding side one by one. When the partition strategy is continuously adjusted based on the image during the encoding process, it can be directly or indirectly encoded into the code stream, and accordingly, the decoding end acquires corresponding parameters from the code stream to obtain the same partition strategy and acquire the same image processing unit.

The code rate control module in the preprocessing module 20 is configured to generate a quantization parameter so that the quantization module 23 and the inverse quantization module 25 can perform relevant calculation. Wherein, during the process of calculating the quantization parameter, the code rate control module can acquire the image information of the current block for calculation, such as the above input information; it can also acquire a reconstructed value obtained by the reconstruction through the summator 201 for calculation, which is not limited in the present application.

The prediction module 21 can provide a prediction block to the summator 202 to generate a residual block, and provide the prediction block to the summator 201 to be reconstructed to obtain a reconstructed block, which is configured as a reference pixel for subsequent prediction. Wherein, the video encoder 102 subtracts the pixel value of the prediction block from the pixel value of the original block to form a pixel difference, which is a residual block, and the data in the residual block may include luminance difference and chrominance difference. The summator 201 represents one or more assemblies that perform this subtraction operation. The prediction module 21 can also send relevant syntax elements to the entropy encoding module 24 for merging into the code stream.

The transformation module 22 can divide the residual block into one or more TUs for transformation. The transformation module 22 may transform the residual block from a pixel domain to a transform domain (e.g., a frequency domain). For example, the residual block is transformed to obtain a transformation coefficient using a Discrete Cosine Transform (DCT) or a Discrete Sine Transform (DST). The transformation module 32 may send the obtained transformation coefficient to the quantization module 22.

The quantization module 23 may perform quantization based on the quantization unit. Wherein, the quantization unit can be the same as the CU, TU and PU mentioned above, and can also be further divided in the partition module. The quantization module 23 quantizes the transformation coefficient to further reduce the code rate to obtain a quantized coefficient. Wherein, the quantization process may reduce the bit depth associated with some or all of the coefficients. The degree of quantization can be modified by adjusting the quantization parameter. In some feasible embodiments, the quantization module 23 may then perform a scan of a matrix containing quantized transformation coefficients. Alternatively, the entropy encoding module 24 may perform the scan.

After quantization, the entropy encoding module 24 may perform entropy encoding on the quantized coefficient. For example, the entropy encoding module 24 may perform a Context-Adaptive Variable-Length Coding (CAVLC), the Context-based Adaptive Binary Arithmetic Coding (CABAC), a Syntax-based Context-based Adaptive Binary Arithmetic Decoding (SBAC), a Probability Interval Partition Entropy (PIPE) decoding, or another entropy encoding method or technology. The code stream is obtained after the entropy encoding is performed by the entropy encoding module 24, and the code stream can be transmitted to the video decoder 112 or archived for transmission or being retrieved by the video decoder 112 later.

The inverse quantization module 25 and the inverse transformation module 26 apply inverse quantization and inverse transformation respectively, and the summator 201 adds the residual block obtained after being inverse transformed and the predicted residual block to generate a reconstructed block, which is configured as a reference pixel for a subsequent prediction of the original block. The reconstructed block is stored in the reference image memory 27.

Figure 3:
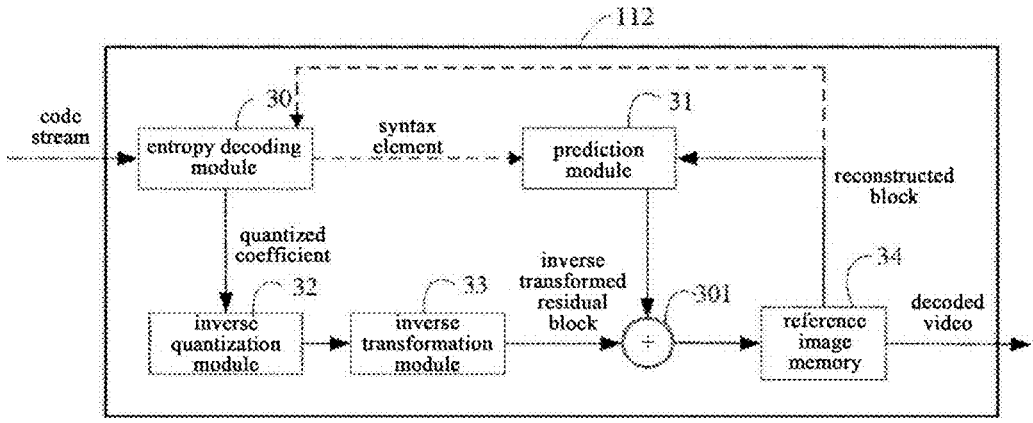
FIG. 3 is a schematic diagram of a structure of a video decoder provided by an embodiment of the present application.

FIG. 3 is a schematic diagram of a structure of a video decoder 112 in an embodiment of the present application. As shown in FIG. 3, the video decoder 112 includes an entropy decoding module 30, a prediction module 31, an inverse quantization module 32, an inverse transformation module 33, a summator 301 and a reference image memory 34. Wherein, the entropy decoding module 30 includes a parsing module and a code rate control module. In some feasible embodiments, the video decoder 112 may perform a decoding flow that exemplarily inverses to the encoding flow described regrading to the video encoder 102 of FIG. 2.

During the decoding process, the video decoder 112 receives a code stream of the encoded video from the video encoder 102. The parsing module in the entropy decoding module 30 of the video decoder 112 performs entropy decoding on the code stream to generate quantized coefficients and syntax elements. The entropy decoding module 30 transmits the syntax elements to the prediction module 31. The video decoder 112 may receive the syntax elements at the video slice grade and/or the video block grade.

The code rate control module in the entropy decoding module 30 generates quantization parameters according to information of an image to be decoded obtained by the parsing module, so that the inverse quantization module 32 can perform relevant calculation. The code rate control module can also calculate quantization parameters according to the reconstructed block obtained by the reconstruction through the summator 301.

The inverse quantization module 32 performs inverse quantization (e.g., dequantization) on the quantized coefficients provided in the code stream and decoded by the entropy decoding module 30 and the generated quantization parameter. The inverse quantization process may include determining a degree of quantization using the quantization parameter calculated by the video encoder 102 for each video block in a video slice, and similarly, determining a degree of inverse quantization applied. The inverse transformation module 33 applies inverse transformation (for example, transformation methods such as DCT and DST, etc.) to the inverse quantized transformation coefficients, and an inverse transformed residual block is generated in the pixel domain through the inverse transformation unit based on the inverse quantized transformation coefficients. Wherein, a size of the inverse transformation unit is the same as that of TU, and the inverse transformation method and transformation method adopt forward transformation and corresponding inverse transformation in the same transformation method, for example, inverse transformations of DCT and DST are inverse DCT, inverse DST, or a conceptually similar inverse transformation process.

After the prediction module 31 generates a prediction block, the video decoder 112 forms a decoded video block by summing the inverse transformed residual block from the inverse transformation module 33 with the prediction block. Summator 301 represents one or more assemblies that perform this summation operation. If required, a deblocking filter can also be applied to filter the decoded block in order to remove block effect artifacts. The decoded image blocks in a given frame or images are stored in the reference image memory 34 as a reference pixel for subsequent prediction.

Figure 4:
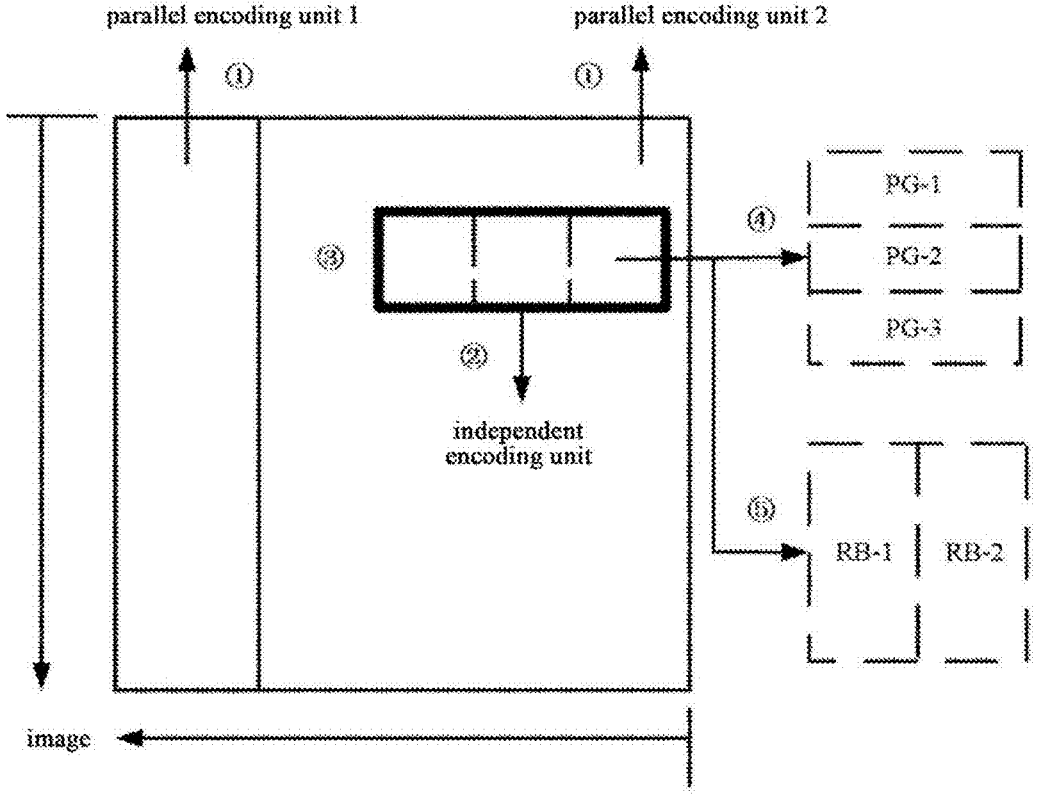
FIG. 4 is a schematic diagram of a process of a video decoding provided by an embodiment of the present application.

The present application provides a possible video encoding/decoding implementation, as shown in FIG. 4, which is a schematic diagram of a process of a video encoding and decoding provided by the present application. The video encoding/decoding implementation includes process ① to process ⑤, which can be performed by any one or more of the above source device 10, video encoder 102, destination device 11 or video decoder 112.

Process ①: Dividing a frame of image into one or more parallel encoding units that do not overlap each other. The one or more parallel encoding units have no dependency on each other, and can be encoded and decoded completely in parallel/independently, such as parallel encoding unit 1 and parallel encoding unit 2 shown in FIG. 4.

Process ②: Each parallel encoding unit can be further divided into one or more independent encoding units that do not overlap each other. All the independent encoding units may not depend on each other, but can share some parallel encoding unit header information.

The independent encoding unit can either include three components of luminance Y, first chrominance Cb and second chrominance Cr, or three components of RGB, or it can include only one of the components. If the independent encoding unit includes three components, the sizes of these three components can be exactly the same or different, which depends on the input format of the image. The independent encoding unit can also be understood as one or more processing units formed by N-channels contained in each parallel encoding unit. For example, the above three components of Y, Cb and Cr are the three channels constituting the parallel encoding unit, of which each can be an independent encoding unit, or, Cb and Cr can be collectively referred to as a chrominance channel, and then the parallel encoding unit includes an independent encoding unit consisting of a luminance channel and an independent encoding unit consisting of a chrominance channel.

Process ③: Each independent encoding unit can be further divided into one or more encoding units that do not overlap each other. All the encoding units in the independent encoding unit may depend on each other, for example, multiple encoding units can be pre-encoded and pre-decoded with reference to each other.

If the encoding unit has the same size as the independent encoding unit (that is, the independent encoding unit is only divided into only one encoding unit), it can be of all the sizes described in Process ②.

The encoding unit can either include three components of luminance Y, first chrominance Cb and second chrominance Cr (or three components of RGB), or it can include only one of the components. If three components are included, the sizes of these components can be exactly the same or different, which depends on the input format of the image.

It is worth noting that process ③ is an optional step in the video encoding and decoding method, and the video encoder/decoder can encode/decode the residual coefficient (or residual value) of the independent encoding unit obtained in process ②.

Process ④: The encoding unit can be further divided into one or more Prediction Group (PG) that do not overlap each other, which can also be referred to as Group for short. Each PG is encoded and decoded according to a selected prediction mode to obtain a prediction value of PG, which constitutes the prediction value of the whole encoding unit. Based on the prediction value and the original value of the encoding unit, the residual value of the encoding unit is obtained.

Process ⑤: Based on the residual values of encoding units, encoding units are grouped to obtain one or more residual blocks (RBs) that do not overlap each other, and the residual coefficients of all of RBs are encoded and decoded according to the selected mode to form a residual coefficient stream. Specifically, the residual coefficients can be divided into two categories: transformed and untransformed.

Wherein, the selected mode of the method of encoding and decoding residual coefficients in process ⑤ may include, but is not limited to, any of the following: a semi-fixed length encoding method, an exponential Golomb encoding method, a Golomb-Rice encoding method, a truncated unary code encoding method, a run-length encoding method, a direct encoding method of original residual values, etc.

For example, the video encoder can directly encode the coefficients within the RB.

For another example, the video encoder can also perform transformation, such as DCT, DST, Hadamard transform, etc., on the RB, and then encode the transformed coefficient.

As a possible example, when the RB is small, the video encoder can directly quantize uniformly all the coefficients in the RB and then perform a binary encoding. If RB is large, it can be further divided into multiple coefficient groups (CGs), and then all of the CGs are quantized uniformly, and then performed a binary encoding. In some embodiments of the present application, the coefficient group (CG) and the quantization group (QG) can be the same.

Encoding a residual coefficient in a method of semi-fixed length encoding is exemplarily described below. Firstly, the maximum number of the absolute value of residual in an RB block is defined as a modified maximum (mm). Secondly, the number of bits for encoding a residual coefficient within the RB block is determined (the number of bits for encoding the residual coefficients within the same RB block are consistent). For example, if the critical limit (CL) of the current RB block is 2, the current residual coefficient is 1, then 2 bits are required to encode the residual coefficient 1, which is represented by 01. If the CL of the current RB block is 7, it means that an 8-bit residual coefficient and a 1-bit sign bit are encoded. The CL is determined by finding the minimum M value that satisfies that all residuals of the current sub-block are within a range of $[-2^{\wedge}(M-1), 2^{\wedge}(M-1)]$. If both boundary values of $-2^{\wedge}(M-1)$ and $2^{\wedge}(M-1)$ exist, M should be increased by 1, that is, M+1 bits are required to encode all residuals of the current RB block; if only one of the two boundary values $-2^{\wedge}(M-1)$ and $2^{\wedge}(M-1)$ exists, it is necessary to encode a Trailing bit to determine whether the boundary value is $-2^{\wedge}(M-1)$ or $2^{\wedge}(M-1)$; and if none of $-2^{\wedge}(M-1)$ and $2^{\wedge}(M-1)$ exist in all of the residuals, there is no need to encode the Trailing bit.

In addition, for some special cases, the video encoder can also directly encode the original value of the image instead of the residual value.

Figure 5:
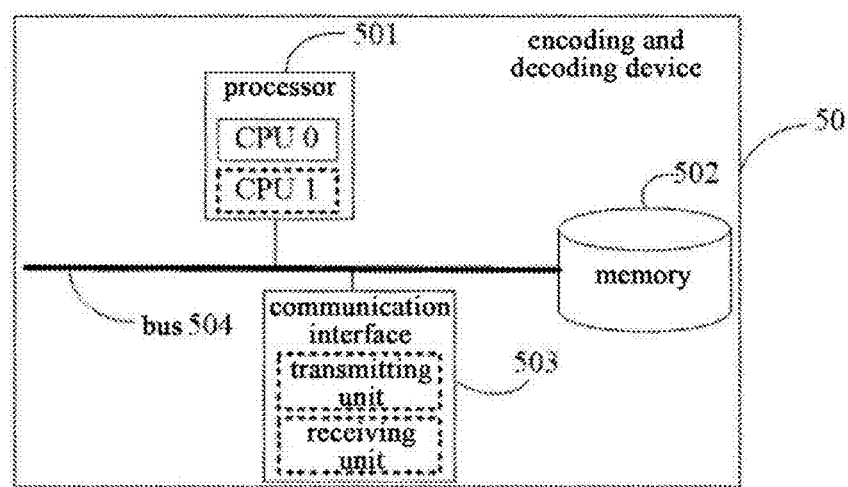
FIG. 5 is a schematic diagram of a structure of a video decoder provided by an embodiment of the present application.

The above video encoder 102 and video decoder 112 can also be implemented in another form, for example, by using a general digital processor system, such as the encoding and decoding device 50 shown in FIG. 5, which can be a part of the video encoder 102 or a part of the video decoder 112.

The encoding and decoding device 50 can be applied to an encoding side or a decoding side. The encoding and decoding device 50 includes a processor 501 and a memory 502. The processor 501 is connected to a memory 502 (e.g., connected to each other via a bus 504). Optionally, the encoding and decoding device 50 may further include a communication interface 503, which is connected to the processor 501 and the memory 502 for receiving/transmitting data.

The memory 502 may be a Random Access Memory (RAM), a Read-Only Memory (ROM), an Erasable Programmable Read-Only Memory (EPROM) or a Compact Disc Read-Only Memory (CD-ROM). The memory 502 is configured for storing relevant program codes and video data.

The processor 501 may be one or more Central Processing Units (CPU), such as CPU 0 and CPU 1 shown in FIG. 5. In the case where the processor 501 is one CPU, the CPU may be a single-core CPU or a multi-core CPU.

The processor 501 is configured for reading program codes stored in the memory 502 and executing operations of any one of the embodiments corresponding to FIG. 6 and various feasible implementations thereof.

Hereinafter, the en/decoding method provided by the present application will be described in detail in combination with the video encoding and decoding system shown in FIG. 1, the video encoder 102 shown in FIG. 2 and the video decoder 112 shown in FIG. 3.

As shown in FIG. 6, which is a flowchart of a video image decoding method or encoding method provided by the present application, the method includes:

S601, acquiring at least two channel-grade complexity levels of a current block in an image to be processed, and determining a block-grade complexity level of the current block according to the at least two channel-grade complexity levels; wherein the channel-grade complexity level is determined by a complexity degree of a channel-grade texture of the current block.

The video image decoding method or encoding method provided by the present application are applied to an encoding or decoding scenario of video data. The video data is composed of frames of images, and a frame is a static image. A sequence of temporally continuous frames is synthesized together to form a dynamic video. The above image to be processed is an image to be en/decoded in the video data. When en/decoding the video, the image to be processed is divided into multiple image blocks, which are configured as basic processing units and are processed line by line and one by one. Wherein, the image block being processed is referred to as the current block.

In this exemplary implementation, the above image to be processed may be a multi-channel image, and the above-mentioned step of acquiring the at least two channel-grade complexity levels of the current block in the image to be processed, and determining the block-grade complexity level of the current block according to the at least two channel-grade complexity levels, refers to acquiring complexity levels of at least two channels of a current multi-channel image block, and determining the block-grade complexity level of the current block based on this. For example, the image to be processed may be an image in a YUV format, and complexity levels of the Y channel and the U channel may be acquired, and the block-grade complexity level of the current block may be determined based on this. It is understandable that by acquiring the complexity levels of YV or UV or YUV, the block-grade complexity level of the current block may also be determined.

The multi-channel in the present application is not limited to the aforementioned three channels of YUV, but there may be more channels. For example, when the image sensor is a four-channel sensor, a corresponding image to be processed includes image information of four channels. For example, when the image sensor is a five-channel sensor, a corresponding image to be processed includes image information of five channels.

The multiple channels in the present application can include at least one or more of the following channels: a Y channel, a U channel, a V channel, a Co channel, a Cg channel, an R channel, a G channel, a B channel, an alpha channel, an IR channel, a D channel and a W channel. For example, the multiple channels include a Y channel, a U channel and a V channel; or the multiple channels include a R channel, a G channel and a B channel; or the multiple channels include an R channel, a G channel, a B channel and an alpha channel; or the multiple channels include an R channel, a G channel, a B channel and an IR channel; or the multiple channels include an R channel, a G channel, a B channel and a W channel; or the multiple channels include an R channel, a G channel, a B channel, an IR channel and a W channel; or the multiple channels include an R channel, a G channel, a B channel and a D channel; or the multiple channels can include an R channel, a G channel, a B channel, a D channel and a W channel. Wherein, in addition to RGB color photosensitive channels, there may also be an IR channel (an infrared or near-infrared photosensitive channel), a D channel (a dark light channel, mainly through infrared or near-infrared light) and a W channel (a panchromatic photosensitive channels). There are different channels for different sensors, for example, the sensor types can be RGB sensors, RGBIR sensors, RGBW sensors, RGBIRW sensors, RGBD sensors, RGBDW sensors, etc.

Texture is a visual feature that reflects homogeneous phenomena in an image. It is configured to represent arrangement properties of surface structure organization with slow or periodic changes of an object's surface. The above channel-grade complexity level is determined by the complexity degree of the channel-grade texture of the current block. The more complex the channel-grade texture information of the current block is, the higher the channel-grade complexity level is. Similarly, the simpler the above channel-grade texture information is, the lower the channel-grade complexity level is.

The above-mentioned step of acquiring at least two channel-grade complexity levels of the current block in the image to be processed, and determining the block-grade complexity level of the current block according to the at least two channel-grade complexity levels may be implemented in different ways at an encoding end and an decoding end of the video en/decoding. In one embodiment:

At the encoding end, it can be implemented as follows: acquiring the channel-grade texture information of the current block, and determining the block-grade complexity level of the current block based on the channel-grade texture information. Specifically, the process can be implemented as follows: taking at least one channel image block of the current block as a processing unit, and dividing each processing unit into at least two sub-units, determining texture information of each sub-unit; in each processing unit, determining the block-grade complexity level of the current block based on the texture information of each sub-unit.

Wherein, regarding the above process of taking at least one channel image block of the current block as a processing unit, and dividing each processing unit into at least two sub-units, taking the image to be processed as a YUV image as an example, in one possible scenario, the process can be implemented as follows: taking a Y channel of the current block as a processing unit, and further dividing the processing unit into four sub-units. In another possible scenario, the process can also be implemented as follows: taking two channels, i.e., a Y channel and a U channel, as a processing unit, and further dividing the processing unit into two sub-units. It can be understood that the above scenario is for illustrative purposes only, and the protection scope of this exemplary implementation is not limited to this. For example, the U channel, a V channel, a YU channel, a YV channel, a UV channel, and a YUV channel can also be taken as a processing unit, and the number of the above sub-units can also be any integer greater than or equal to two.

In one possible implementation, determining the texture information of each sub-unit can be implemented as follows: acquiring original pixel values of the sub-unit, original pixel values or reconstructed values of an adjacent left column to the sub-unit, and reconstructed values of an adjacent upper row to the sub-unit, and calculating horizontal texture information and vertical texture information of the sub-unit respectively; selecting a minimum value from the horizontal texture information and the vertical texture information as the texture information of the sub-unit to which the horizontal texture information and the vertical texture information correspond.

Specifically, the above texture information can be pixel point information. For example, when the image to be processed is a YUV image, and the Y, U, and V channels are respectively configured as a processing unit, after the processing unit is divided into at least two sub-units, the determination of the sub-unit texture information can be that calculating the horizontal complexity and vertical complexity of the sub-unit based on the original pixel value in the sub-unit, the original pixel value or the reconstructed value in the adjacent left column to the sub-unit, and the reconstructed value in the adjacent upper row to the sub-unit, and selecting the minimum value from the horizontal complexity and vertical complexity as the texture information of the corresponding sub-unit. The above horizontal complexity and vertical complexity can be calculated based on a difference degree of the pixel points of the sub-unit in the horizontal direction and the vertical direction respectively. It can be understood that the above scenario is for illustrative purposes only, and the texture information can also be obtained in other ways, for example, it can be determined by means of image information other than pixel points, or a weighted value of the horizontal complexity and vertical complexity can be selected as the texture information of the corresponding sub-unit, or in other ways that can achieve the same effect. This exemplary implementation does not specifically limit this.

In one possible implementation, in each processing unit, determining the block-grade complexity level of the current block based on the texture information of each sub-unit can be implemented as follows: classifying, in the processing unit, the texture information of each of the sub-units into a corresponding one of sub-unit complexity levels based on multiple thresholds, wherein the multiple thresholds are preset; and determining the block-grade complexity level of the current block based on all sub-unit complexity levels.

Specifically, the above process can be: setting two thresholds, i.e., threshold 1 and threshold 2, and dividing the sub-unit complexity level into three levels from 0 to 2 based on the set thresholds. If it is determined that the obtained complexity of the texture information of the sub-unit is less than or equal to threshold 1, the texture information of the sub-unit is classified into level 0; if it is determined that the obtained complexity of the texture information of the sub-unit is greater than threshold 1 and less than threshold 2, the texture information of the sub-unit is classified into level 1; if it is determined that the obtained complexity of the texture information of the sub-unit is greater than or equal to threshold 2, the texture information of the sub-unit is classified into level 2. It can be understood that the above scenario is only one exemplary scenario, and the protection scope of the present application is not limited to this.

In one possible implementation, determining the block-grade complexity level of the current block based on the sub-unit complexity levels can be implemented as follows: mapping each of the sub-unit complexity levels to a corresponding one of the channel-grade complexity levels according to a preset rule; and determining the block-grade complexity level of the current block based on all of the channel-grade complexity-levels.

Mapping each of the sub-unit complexity levels to the corresponding one of the channel-grade complexity levels according to the preset rule can be implemented as follows:

Implementation 1: determining the channel-grade complexity level based on multiple thresholds and a sum of the sub-unit complexity levels, wherein the multiple thresholds are preset.

In one embodiment, the above process can be implemented as follows: determining multiple channel-grade complexity levels based on the above multiple thresholds, summing the above sub-unit complexity levels, and classifying the sum into a corresponding channel-grade complexity level. Specifically, the above thresholds can be 2, 4, and 7. These three thresholds can divide the channel-grade complexity level into five levels from level 0 to level 4, and the above calculated sub-unit complexity levels involves three orders from 0 to 2. All of the sub-unit complexity levels are summed, if the sum of the sub-unit complexity levels is less than 2, the corresponding channel-grade complexity level is 0; if the sum of the sub-unit complexity levels is greater than or equal to 2 and less than 4, the corresponding channel level is 1; if the sum of the sub-unit complexity levels is equal to 4, the corresponding channel-grade complexity level is 2; if the sum of the sub-unit complexity levels is greater than 4 and less than 7, the corresponding channel-grade complexity level is 3; if the sum of the sub-unit complexity levels is greater than or equal to 7, the corresponding channel-grade complexity level is 4. It can be understood that the above scenario is only an exemplary scenario, and the protection scope of the present application is not limited to this.

Implementation 2: determining an order compositions of the sub-unit complexity level, and determining the corresponding one of the channel-grade complexity levels based on the order composition.

In an embodiment, in a specific scenario, the above process can be implemented as follows: for example, the above sub-unit complexity levels are arranged with multiple orders, and a corresponding channel-grade complexity level is determined based on the level orders and the arrangement manner of sub-units. For example, when the above processing unit is divided into 4 sub-units, and the complexity orders of the 4 sub-units are 1, 2, 2, and 2 respectively, in the case that the preset rule include a decision method in which if all the sub-unit complexity levels contain three 2s, the channel-grade complexity level is 2, then the corresponding channel-grade complexity level is 2. It can be understood that the above scenario is for illustrative purposes only, and other sub-unit division methods and decision methods also fall within the protection scope of this application.

In one possible implementation, there are multiple methods for determining the block-grade complexity level of the current block based on all of the channel-grade complexity levels, illustratively:

Implementation 1: taking a maximum value, a minimum value or a weighted value of all channel-grade complexity levels as the block-grade complexity level of the current block.

Implementation 2: determining the block-grade complexity level of the current block based on multiple thresholds and the sum of all of the channel-grade complexity levels, wherein the multiple thresholds are preset.

In addition, in the present application, the above multi-channel image block, that is, all channel components of the current block can determine the channel-grade complexity level jointly or independently. For example, when the image to be processed is a YUV image, the U channel and the V channel can share a channel-grade complexity level, or their own channel-grade complexity levels can be determined separately.

At the decoding end, it can be implemented as follows: acquiring the channel-grade complexity level of the current block from the code stream, wherein the above code stream is an encoded code stream of the current block. Specifically, the decoding end can receive the encoded code stream of the current block transmitted from the encoding end, wherein the encoded code stream contains complexity information bit for indicating the channel-grade complexity level, and based on the information bit, the channel-grade complexity level determined by the encoding end based on the channel-grade texture information can be obtained, and the block-grade complexity level is determined based on the channel-grade complexity level. Wherein, determining the block-grade complexity level by the at least two channel-grade complexity levels at the decoding end is the same as that at the encoding end, which is not repeated here.

Determining the channel-grade complexity level through the complexity information bit can be implemented as follows: acquiring the complexity information bit of the above current block from the above encoded code stream; determining the channel-grade complexity level according to the complexity information bit. Wherein, the above complexity information bit can be 1-bit or 3-bits, and the first bit of the complexity information bit is to indicate whether the current channel-grade complexity level is the same as the complexity level of the same channel of the previous image block of the current block and the differential value between the two complexity levels. Taking the YUV image as an example, if the current channel-grade complexity level is the complexity level of the U channel of the current block, the complexity of same channel of the previous image block represents the complexity level of the U channel of an image block being en/decoded previous to the current block. If the complexity levels are determined to be the same according to the first bit, the complexity information bit is 1-bit; if they are determined to be different, the complexity information bit is 3-bit, and the last two bits represent the differential value between the channel-grade complexity of the current block and the complexity level of the same channel of the previous image block of the current block. Based on the differential value and the channel complexity level of the same channel of the previous image block, the current channel-grade complexity level being required can be determined. It is understandable that the above scenario is for illustrative purposes only, and the protection scope of this application is not limited to this. For example, the above complexity information bit can also indicate whether the complexity of the U channel of the current block is the same as that of the Y channel of the current block, and the differential value therebetween when the two complexity are different, and which is not limited in this application.

S602, determining a target number of bits of the current block according to a code control parameter, wherein the code control parameter includes the block-grade complexity level of the current block.

In one possible implementation, the code control parameter includes the block-grade complexity level of the current block calculated in step S601, which is configured to determine the target number of bits of the current block, and the target number of bits is the number of bits required to predict the encoding of the current block. The above code control parameter may also include at least one of the following parameters: an image bit width bpc, a target number of bits per pixel bpp, an image format, the number of bits for same-level average lossless encoding, the number of bits for average lossless encoding, buffer fullness of the code stream, a first-row quality improvement parameter, a first-column quality improvement parameter, and the target number of bits of the current block can be determined by one or more of the above code control parameters.

Wherein the above number of bits for same-level average lossless encoding is an average value of predicted values of the numbers of bits required for lossless encoding of the current block and multiple en/decoded image blocks, and the complexity levels of the multiple en/decoded image blocks are the same as that of the current block; the above number of bits for average lossless encoding is an average value of predicted values of the numbers of bits required for lossless encoding of the current block and all of the en/decoded image blocks; the above buffer fullness of the code stream is configured to characterize the fullness of the buffer, and the above buffer is configured to store the code stream of the image to be processed; the above first-row quality improvement parameter is configured to reduce the quantization parameter of the first-row block when the current block is the first-row block in the image to be processed, so as to reduce the impact caused by the difficulty of predicting the first-row block and the transitivity of the prediction error.

In one possible implementation, the above code control parameters may include the number of bits for same-level average lossless encoding, the number of bits for average lossless encoding, and the buffer fullness of the code stream. Determining the target number of bits of the current block according to the code control parameter may be implemented as follows: determining the number of bits for same-level average lossless encoding and the number of bits for average lossless encoding; determining the initial target number of bits based on the number of bits for same-level average lossless encoding and the number of bits for average lossless encoding; determining the target number of bits of the current block based on the buffer fullness of the code stream, the block-grade complexity level of the current block, and the initial target number of bits. Wherein, the calculation of the buffer fullness of the code stream may be affected by an initial transmission delay mechanism, which refers to the influence of some invalid bits existing in the buffer before the encoded code stream of the current block is stored, on the buffer fullness.

In one embodiment, determining the number of bits for same-level average lossless encoding and the number of bits for average lossless encoding can be implemented as follows: determining the number of bits for lossless encoding of the current block, which is a predicted value of the number of bits required for lossless encoding of the current block; updating the number of bits for same-level average lossless encoding of the current block based on the number of bits for lossless encoding of the current block and multiple historical number of bits for same-level average lossless encoding; updating the number of bits for average lossless encoding of the current block based on the number of bits for lossless encoding of the current block and all historical number of bits for average lossless encoding. Wherein, the above historical number of bits for same-level average lossless encoding is the number of bits for same-level average lossless encoding of the en/decoded image blocks with the same block-grade complexity level as the current block, and the above historical number of bits for average lossless encoding is the number of bits for average lossless of the en/decoded image blocks.

In one possible implementation, when the current block is a first-row block in the image to be processed, the above code control parameter further includes a first-row quality improvement parameter, and determining the target number of bits of the current block according to the code control parameter can be implemented as follows: determining the initial target number of bits based on the number of bits for same-level average lossless encoding and the number of bits for average lossless encoding; determining the target number of bits of the current block based on the buffer fullness of the code stream, the block-grade complexity level of the current block, the first-row quality improvement parameter and the initial target number of bits. Wherein, the above first-row quality improvement parameter improves the image quality of the current block mainly by reducing the quantization parameter of the current block.

In one possible implementation, when the current block is the first-column block in the image to be processed, the above code control parameter further includes a first-column quality improvement parameter, and determining the target number of bits of the current block according to the code control parameter can be implemented as follows: determining the initial target number of bits based on the number of bits for same-level average lossless encoding and the number of bits for average lossless encoding; determining the target number of bits of the current block based on the buffer fullness of the code stream, the block-grade complexity level of the current block, the first-column quality improvement parameter and the initial target number of bits. Wherein, the above first-column quality improvement parameter improves the image quality of the current block mainly by reducing the quantization parameter of the current block.

In addition, in the above process, the above multi-channel image block, that is, channel components of the current block, can jointly or independently determine the above number of bits for same-level lossless encoding and the target number of bits.

S603, determining the quantization parameter of the current block based on the target number of bits.

In one possible implementation, determining the quantization parameter of the current block based on the target number of bits can be implemented as follows: performing a calculation to obtain a reference quantization parameter of the current block based on the above number of bits for same-level average lossless encoding, the target number of bits, and a sampling rate corresponding to the image format of the above image to be processed, and further calculating a component quantization parameter corresponding to each of channels of the current block based on the reference quantization parameter.

S604, performing en/decoding on the current block based on the quantization parameter.

In this step, the video codec performs an en/decoding on the current block based on the quantization parameter of the current block. Optionally, during encoding, the video encoder encodes the channel-grade complexity level of the current block into the code stream, that is, the complexity information bit mentioned above. Or the video encoder encodes the quantization parameter of the current block into the code stream. Accordingly, the decoding end acquires the complexity information bit in the code stream to calculate the quantization parameter for decoding, or the decoding end acquires the quantization parameter in the code stream for decoding. Of course, the video encoder can also encode both of the above two types of information into the code stream.

Next, taking the above image to be processed being a YUV image as an application scenario, combined with the process shown in FIG. 7, the above video image decoding method or encoding method are described in detail through a series of specific embodiments:

Step S701, determining a block-grade complexity level of a current block.

This step is to determine the complexity level of the current block, and there are differences in implementation processes of a video encoding end and of a video decoding end.

At a video encoding end, the process is mainly implemented by the process shown in FIG. 8:

S801, determining a complexity of texture information of a current block.

This step can be implemented as: taking at least one channel image block of the current block as a processing unit, dividing each processing unit into at least two sub-units, and determining the complexity of texture information of sub-units.

Specifically, taking the format of YUV444 as an example, each 16×2 channel can be divided into four 4×2 sub-blocks, as shown in FIG. 9.

The texture information of the current block is pixel information of the current block. The calculation of the complexity of the current block requires the use of pixel points of the following three parts, as shown in FIG. 9: (1) original pixel values of the current block; (2) original pixel values of a column on the left of the current block, that is, original pixel values of an adjacent left column of sub-block 1. It should be noted that when the original pixel value cannot be acquired, a reconstructed value can also be configured; (3) the reconstructed value in an adjacent upper row of the current block, that is, a gray square area in FIG. 9.

Next, taking the sub-block 1 in FIG. 9 as an example to explain the calculation process of the sub-block complexity, that is, the process of determining the texture information of each of the sub-units mentioned above, which can usually be obtained by calculating a horizontal complexity and vertical complexity of each of the sub-blocks, it can be implemented as follows: the horizontal complexity is calculated as: the sum of absolute values of the pixel value of the current column and the pixel value of the adjacent left column of the current column; the vertical complexity is calculated as: the sum of the absolute values of the pixel value of the current row and the pixel value of the adjacent upper row of the current column.

In one embodiment, when the current block is at a left boundary of the current video slice, the above calculation of the horizontal complexity uses a filling value of the left boundary, which is the pixel value of the current column; accordingly, when the current block is at an upper boundary of the current video slice, the above calculation of the vertical complexity uses a filling boundary of the upper limit, which is the pixel value of the current row.

Specifically, the above process can be implemented as follows:

First, the horizontal complexity sub_comp_hor of the sub-block 1 is calculated. Specifically, it can be calculated by a set ori_pix[i][j] consisting of the pixel values of the sub-block 1, the pixel values or reconstructed values of the adjacent left column of the sub-block 1, and the pixel values of the adjacent upper row of the sub-block 1. Wherein, i, j represent the row and column where a pixel value is located. The pixel value in the first row and first column of the sub-block 1 is represented as ori_pix[0][0], and other pixel values are represented in an analogous manner. The horizontal complexity sub_comp_hor of the sub-block 1 refers to a difference degree of the pixel points of the sub-block 1 in the horizontal direction, and is specifically calculated as follows:

$$\text{sub\_comp\_hor1} \mathrel{+}= \text{ori\_pix}[0][-1] = -\text{ori\_pix}[0][0]$$

An absolute value of the above expression is taken as a horizontal complexity between the pixel value in the first row and first column of the sub-block 1 and the adjacent left pixel value thereof.

$$\text{sub\_comp\_hor2} \mathrel{+}= \text{ori\_pix}[0][i] - \text{ori\_pix}[0][i+1]$$

An absolute value of the above expression is taken as the horizontal complexities of the pixel values in the first row of the sub-block 1.

$$\text{sub\_comp\_hor3} \mathrel{+}= \text{ori\_pix}[1][-1] - \text{ori\_pix}[1][0]$$

An absolute value of the above expression is taken as the horizontal complexity between the pixel value in the second row and the first column of the sub-block 1 and the adjacent left pixel value thereof.

$$\text{sub\_comp\_hor4} \mathrel{+}= \text{ori\_pix}[1][i] - \text{ori\_pix}[1][i+1]$$

An absolute value of the above expression is taken as the horizontal complexities between the pixel values in the second row of the sub-block 1.

A vertical complexity sub_comp_ver of the sub-block 1 refers to a difference degree of the pixel points of the sub-block 1 in the vertical direction. Similarly, the vertical complexity sub_comp_ver can be specifically calculated as follows:

$$\text{sub\_comp\_ver1} \mathrel{+}= \text{rec\_pix}[-1][i] - \text{ori\_pix}[0][i]$$

An absolute value of the above expression is taken as the vertical complexities between the pixel values in the first row of the sub-block 1 and the adjacent upper row of the sub-block 1.

$$\text{sub\_comp\_hor2} \mathrel{+}= \text{ori\_pix}[0][i] - \text{ori\_pix}[1][i]$$

An absolute value of the above expression is taken as the vertical complexities between the pixel values of the second row and the first row of sub-block 1.

After obtaining multiple horizontal complexities and multiple vertical complexities of the sub-block 1, the minimum one therein is configured as complexity comp of texture information of the sub-block 1, that is, the complexity of the sub-block 1 is:

$$\text{sub\_comp} = \min(\text{sub\_comp\_hor}, \text{sub\_comp\_ver})$$

The calculation method of the texture information complexities of the above sub-blocks 2, 3, and 4 is the same as that of the sub-block 1, and the method of dividing the textures of the channels U and V into sub-blocks and calculating the complexity of texture information of the sub-block is the same as that of the channel Y, which will not be repeated here.

In addition, if multiple channels need to be combined to calculate the complexity, for example, when the U channel and the V channel need to be combined to calculate the complexity, it can be implemented by the following formula:

$$sub\_comp = sub\_comp1 * a + sub\_comp2 * b,$$

$$wherein\ 0 <= a, b <= 1, a + b = 1$$

Step S802, determining the block-grade complexity level of the current block based on the complexities of texture information of the channel sub-blocks.

In one embodiment, this step can be implemented in three steps:

S8021: determining the complexity level of each channel sub-block according to the complexity of texture information of each channel sub-block.

This process can be implemented by setting multiple thresholds. In one embodiment, the specific implementation can be as follows:

Implementation 1: setting two thresholds, thres1 and thres2:

$$thres1 = 2 * (1 << (bpc - 8));\ thres2 = 6 * (1 << (bpc - 8)),$$

$$wherein\ bpc >= 8,$$

bpc is a bit width of an image.

When bpc is less than 8, the above two thresholds default to 2 and 6.

The complexity sub_comp of the texture information of each of the sub-blocks is classified into three complexity levels: order 0, order 1 and order 2 by means of the above two thresholds, the specific classification is:

if sub_comp<=thres1, sub_comp_level=0; if thres1<sub_comp<thres2, sub_comp_level=1; if sub_comp>=thres2, sub_comp_level=2.

Implementation 2: setting four thresholds, thres1, thres2, thres3 and thres4: thres1=2*(1<<(bpc−8)), thres2=4*(1<<(bpc−8)), thres3=6*(1<<(bpc−8)), thres4=8*(1<<(bpc−8)). And wherein bpc>=8.

By means of the above four thresholds, the complexity sub_comp_level of the texture information of each sub-block is classified into following levels: 0, 1, 2, 3, 4, the specific classification is:

if sub_comp<=thres1, sub_comp_level=0; if thres1<sub_comp<thres2, sub_comp_level=1; if thres 2<sub_comp<thres 3, sub_comp_level=2; if thres 3<sub_comp<thres 4, sub_comp_level=3; if sub_comp>=thres 4, sub_comp_level=4.

S8022: mapping the complexity level of each channel sub-block to a channel-grade complexity level.

Mapping the complexity level of each channel sub-block to the channel-grade complexity level can be achieved by presetting multiple thresholds and mapping based on the thresholds, or based on a preset mapping strategy. In one embodiment, there are the following three implementations:

Implementation 1: setting the multiple thresholds, calculating a sum of thresholds of all sub-blocks in a correspond-ing channel sub_comp_level, and mapping the complexity of texture information of each sub-block to the channel-grade complexity level of a corresponding channel accord-ing to the multiple thresholds. Taking the channel sub-blocks shown in FIG. 9 as an example, the process can be specified as follows:

Setting three thresholds, 2, 4, and 7, calculating the sum of the complexity levels sum_sub_comp_level of sub-block 1 to sub-block 4, and mapping the four 3-order complexities of texture information sub_comp_level (0, 1, 2) of sub-blocks to one 5-order channel-grade complexity level com-p_level (0, 1, 2, 3, 4) based on the above three thresholds.

The above process of mapping the complexity of texture information of each sub-block according to the thresholds to obtain the channel-grade complexity level comp_level (0, 1, 2, 3, 4) is: if sum_sub_comp_level<2, comp_level=0; if 2<=sum_sub_comp_level<4, comp_level=1; if sum_sub_comp_level==4, comp_level=2; if 4<sum_sub_comp_level<7, comp_level=3; if 7<=sum_sub_com-p_level, comp_level=4.

Implementation 2: presetting 4 thresholds, 5, 7, 10, 12, summing all sub_comp_levels, and then obtaining com-p_level according to the above 4 thresholds, wherein pos-sible values of comp_level are (0, 1, 2, 3, 4). In this implementation, different from the implementation 1, four 5-order sub_comp_levels can be mapped to one 5-order comp_level.

Implementation 3: obtaining comp_level according to a preset logic rule. In one embodiment, taking the luminance channel of the current block as an example, the decision method of the logic rule can be as follows:

Regarding the order composition of the complexity level composed of the sub_comp_level of the four sub-blocks determined above:

when the order composition of the complexity level contains two 0s, or one 0 and three 1s:

if there are two consecutive 0s and the number of 2s is less than two, comp_level=0;

otherwise comp_level=1.

When the order composition of complexity level contains three 2s, or two consecutive 2s:

if there are three 2s, comp_level=4; otherwise com-p_level=3.

In other cases, comp_level=2.

Taking a 16×2 chrominance channel of the current block as an example, the decision method of the above logic rule can be:

when the order composition of the complexity level contains two 0s and the number of 2s is less than two:

if there are three 0s, or two consecutive 0s and zero 2s, comp_level=0; otherwise comp_level=1.

when the order composition of complexity level contains two 2s, or one 2 and three 1s:

if there are three 2s, or two consecutive 2s and zero 0s, comp_level=4; otherwise comp_level=3.

In other cases, comp_level=2.

In addition, in another possible implementation, taking the 8×2 or 8×1 chrominance channel of the current block as an example, the decision method of the above logic rule can also be: comp_level=sub_comp_level1+sub_comp_level2, wherein sub_comp_level1 and sub_comp_level2 are com-plexity levels of the two sub-blocks of the chrominance channel respectively.

S8023: determining the block-grade complexity level of the current block based on all of the channel-grade com-plexity levels.

Taking the above image to be processed as a YUV image as an example, after the above steps S8021 and S8022, the channel-grade complexity levels of the Y channel, the U channel, and the V channel may be determined. In one embodiment, determining the block-grade complexity level of the current block based on all of the channel-grade complexity levels may be implemented as follows:

Implementation 1: determining the block-grade complexity level blk_comp_level of the current block based on the sum of the above channel-grade complexity levels:

$$chroma\_comp\_level = (u\_comp\_level + v\_comp\_level)/2$$

$$blk\_comp\_level =$$

$$(luma\_comp\_level + chroma\_comp\_level * sample\_rate)/(1 + sample\_rate),$$

wherein sample_rate is a sampling rate of the image to be processed, which is determined by an image format of the image to be processed. One setting method for sample_rate can be found in Table 1 below:

TABLE 1

| image format | YUV400 | YUV420 | YUV422 | RGB444 | YUV444 |
|---|---|---|---|---|---|
| sample_rate | 0 | 0.5 | 1 | 2 | 2 |
| format_bias | 0 | 8/9 | 2/3 | 1 | 4/9 |

In Table 1 above, sample_rate is a sampling rate of the image to be processed, and format_bias is a bias set when calculating the quantization parameter.

In the above steps S8021 to S8023, the channel-grade complexity level can be shared by multiple channels or can be determined independently by multiple channels. For example, if it is a YUV or YCoCg format image, the luminance uses one complexity, the chrominance shares one complexity, or the three channels determine the channel complexity level independently.

Wherein when the first chrominance and the second chrominance share one complexity level, the complexity level is calculated as follows:

Implementation 1: taking the minimum value, the maximum value or the weighted value of the channel-grade complexity levels of the two chrominance channels.

Implementation 2: taking the minimum value, the maximum value or the weighted value of the complexities of texture information of the two chrominance channels as the texture complexity of the chrominance, and then acquiring the channel-grade complexity level of the chrominance according to the method of the above steps S8021 to S8023.

At the video decoding end, acquiring the channel-grade complexity levels from the code stream encoded by the encoding end can be implemented as follows: acquiring complexity information bit of the above current block from the above encoded code stream; determining the channel-grade complexity level according to the complexity information bit. Wherein, the above complexity information bit can be 1-bit or 3-bits, and the first bit of the complexity information bit is configured to indicate whether the current channel-grade complexity level is the same as the complexity level of the same channel of the previous image block of the current block and the differential value between the two complexity levels.

Specifically, taking the image to be processed being a YUV image as an example, the decoding end acquiring the channel-grade complexity level can be implemented as follows: if the current channel-grade complexity level is the complexity level of the U channel of the current block, the complexity of the same channel of the previous image block represents the complexity level of the U channel of an image block being en/decoded previous to the current block. If the complexity levels are determined to be the same according to the first bit, the complexity information bit is 1-bit; if they are determined to be different, the complexity information bit is 3-bit, and the last two bits represent the differential value between the channel-grade complexity of the current block and the complexity level of the same channel of the previous image block of the current block. Based on the differential value and the channel complexity level of the same channel of the previous image block, the current channel-grade complexity level being required can be determined. It can be understood that the above scenario is for illustrative purposes only, and the protection scope of the present application is not limited to this. For example, the above complexity information bit can also indicate whether the complexity of the U channel of the current block is the same as that of the Y channel of the current block, and the differential value therebetween, when the complexity of the U channel of the current block is different from that of the Y channel of the current block.

Step S702, determining the number of bits for same-level average lossless encoding of the current block and the number of bits for average lossless encoding of the current block.

When the first chrominance and the second chrominance of the YUV image share one channel-grade complexity level, determining the number of bits for same-level average lossless encoding of the current block and the number of bits for average lossless encoding of the current block may be implemented as follows:

S7021, determining the number of bits for lossless encoding pred_lossless_bits.

$$pred\_lossless\_bits =$$

$$(cu\_bits/(width \times height) + luma\_gp/a + sample\_rate * chroma\_qp/b)/$$

$$(1 + sample\_rate)$$

Wherein, cu_bits represents the actual number of bits for encoding of the current block, which can be determined based on the number of bits for encoding of the en/decoded image; width and height represent the width and height of the encoding block respectively, luma_qp represents the quantization parameter of the luminance channel of the en/decoded image, and chroam_qp represents the quantization parameter of the chrominance channel of the en/decoded image; a and b are weight values, and settings of a and b are related to a prediction mode, the default values of both are 8: for an IBC mode, a, b>=8; for a point prediction mode, a, b>=8; for a palette mode, an original value mode and a residual skip mode, because the quantization parameters are invalid, a, b==0.

In addition, when the buffer is full and in a residual skip mode:

$$pred\_lossless\_bits = bpc + c$$

Wherein, the parameter c is related to the image format and it is 0.67 only in a RGB mode and 0 in other formats.

S7022, determining the number of bits for same-level average lossless encoding lossless_bits[blk_comp_level].

The number of bits for same-level average lossless encoding lossless_bits[blk_comp_level] corresponds to the block-grade complexity level of the current block. When the block-grade complexity level of the current block is the same as the block-grade complexity level of the en/decoded image block, which is updated by the following formula:

$$\text{lossless\_bits[blk\_comp\_level]} =$$
$$\text{lossless\_bits[blk\_comp\_level]} * (1 - d) + \text{pred\_lossless\_bits} * d$$

wherein, d is an update rate, and 0<=d<=1.

In one embodiment, a specific method for setting the update rate d may be: for the first four image blocks with any complexity, the update rate d is set to ¾, ⅝, ½, ⅜ respectively, and ¼ in the remaining cases.

S7023, determining the number of bits for average lossless encoding avg_lossless_bits.

The number of bits for average lossless encoding avg_lossless_bits is updated in each block, which is different from the number of bits for same-level average lossless encoding. The specific update method can be:

$$\text{avg\_lossless\_bits} = \text{avg\_lossless\_bits} * (1 - e) + \text{avg\_lossless\_bits} * e$$

wherein e is an update rate, 0<=e<=1. In one embodiment, e can be set as e=0.01.

Step S703, determining a target number of bits of the current block.

In one embodiment, determining the target number of bits of the current block may be implemented by the following steps:

S7031, determining an initial target number of bits.

The initial target number of bits is a target number of bits calculated without considering buffer fullness, and can be calculated as follows:

(1) Calculating a quality ratio quality_ratio:

$$\text{quality\_ratio} - bpp/(\text{ave\_lossless\_bits} - \text{comp\_offset}) * (1 + \text{sample\_rate})$$

wherein, comp_offset is a preset value, and one setting method is shown in Table 2 below:

The above bpp is calculated as:

$$bpp = \text{target\_bpp}/16 + (\text{end\_target\_fullness} -$$
$$(\text{cur\_total\_bits} - ((\text{target\_bpp} << 1) \times (\text{cur\_blocks} - 1))))/$$
$$\max(16, \text{slice\_width\_in\_cu} \times \text{slice\_height\_in\_cu} - \text{cur\_blocks})/32$$

wherein, end_target_fullness is a preset value. In one embodiment, a specific setting value of end_target_fullness may be (delay_bits−1533)*¾.

Wherein, delay_bits is a preset value related to the initial transmission delay mechanism, and delay_bits is the number of bits for delaying.

The characteristics of the above initial transmission delay mechanism include: a) when the video slice starts to be transmitted, it is delayed for delay_blks image blocks before being transmitted, and these image blocks are not underflowed; b) the buffer state of the buffer at the end of the video slice is always the delay_bits of bits for delaying (if less than the delay_bits of bits for delaying, filling with zero). As shown in FIG. 10, which is a schematic diagram of the initial transmission delay mechanism, one or more image blocks in the video slice is located between an original position and a second position, a maximum value of the corresponding buffer increases based on a position between the original position and the second position, and for an image block between a threshold position and a final position of the slice, the maximum value of the corresponding buffer decreases based on the position between the threshold position and the final position, and the buffer size corresponding to the image block remains unchanged between the second position and the threshold position.

The above delay_bits can be determined by the following equation: delay_bits=delay_blks*bpp*blk_size; where blk_size represents the size of a block. delay_blks is a preset value.

In addition, if the image to be processed is a YUV444 or RGB image, the value range of the quality_ratio needs to be limited to between 0 and 0.6.

In one embodiment, after the quality ratio is determined, the quality ratio may be updated by calculating the average complexity level ave_comp_level of all the previous image blocks, which may be specifically implemented as follows:

$$\text{avg\_comp\_level} = \text{avg\_comp\_level} * (1 - k) + \text{blk\_comp\_level} * k$$
if avg_comp_level > blk_comp_level , quality_ratio −= 0.05 ;
if avg_comp_level < blk_comp_level , quality_ratio += 0.05 .

TABLE 2

| image format | bit width | | | | | |
| | 8 bits | | 10 bits | | 12 bits | |
| | RGB444 | others | RGB444 | others | RGB444 | others |
|---|---|---|---|---|---|---|
| lossless_bits[0] | 0.5 | 0.0 | 1.5 | 1.0 | 2.0 | 1.5 |
| lossless_bits[1] | 1.3 | 0.8 | 2.5 | 2.0 | 3.2 | 2.7 |
| lossless_bits[2] | 2.1 | 1.6 | 3.5 | 3.0 | 4.4 | 3.9 |
| lossless_bits[3] | 2.9 | 2.4 | 4.5 | 4.0 | 5.6 | 5.1 |
| lossless_bits[4] | 3.7 | 3.2 | 5.5 | 5.0 | 6.8 | 6.3 |
| avg_lossless_bits | 5.5 | 5.0 | 7.0 | 6.5 | 8.0 | 7.5 |
| comp_offset | 0.5 | 0.0 | 2.5 | 2.0 | 3.5 | 3.0 |
| max_lossless_bits | 8.2 | 7.2 | 9.0 | 8.5 | 10.0 | 9.5 |

(2) determining the initial target number of bits.

The above initial target number of bits pre_target_bits can be determined by the following formula:

$$pre\_target\_bits = quality\_ratio *$$

$$(lossless\_bits[blk\_comp\_level] - comp\_offset) * (1 + sample\_rate);$$

wherein comp_offset is a preset value, and one setting method can be found in Table 2 above, and sample_rate can be found in Table 1 above.

S7032, limiting the initial target number of bits according to a buffer state and the block-grade complexity level of the current block, and determining a final target number of bits of the current block, which can be specifically implemented as follows:

(1) the above buffer state can be represented by the buffer fullness, which can be determined based on the following formula:

$$fullness = (cur\_total\_bits -$$

$$((target\_bpp << 1) \times (cur\_blocks - 1))/available\_buffer\_size$$

wherein, cur_total_bits represents the number of bits currently consumed, target_bpp represents the target number of bits per pixel bpp, cur_blocks represents the block number of the image blocks currently processed, and available_buffer_size represents the size of the available buffer.

In addition, in the above process, when determining available_buffer_size, if the influence of the initial transmission delay function is taken into account, the available_buffer_size is different depending on the different positions of the current block in the video slice, as shown in FIG. 10:

delay_blks blocks at the beginning of the video slice, that is, from the original position to the second position, the above available_buffer_size can be linearly increased from delay_bits to max_buffer_size. The increased step start_step is start_step=(max_buffer_size−delay_bits)/delay_blks; wherein max_buffer_size represents the maximum size of the available buffer, which is a preset fixed value.

From the second position to the threshold position, available_buffer_size remains unchanged and is always equal to max_buffer_size.

From the threshold position to the final position, available_buffer_size decreases linearly from max_buffer_size to delay_bits. The reduced step end_step is: end_step=−(max_buffer_size−delay_bits)/(end_blks−thres_blks); wherein end_blks represents the number of blocks at the final position, and thres_blks represents the number of blocks at the threshold position.

The calculation of the delay_blks has been described in detail in the calculation of the quality ratio, so it will not be repeated here.

(2) After determining the buffer fullness, further determining an upper limit and a lower limit for limiting the target number of bits, which can be implemented as follows:

calculating the lower limit min_bits:

wherein, k=Chip3(0, 2.5, max_lossless_bits lossless_bits [blk_comp_level]); max_lossless_bits is a preset value, one specific setting method is shown in Table 2.

calculating the upper limit max_bits:

$$bpp\_offset = min(max\_bpp\_offset - k, 14.29 * (0.85 - fullness))$$
$$bpp\_offset = min(bpp\_offset, -8.46 * fullness + 8.76 - (1 + sample\_rate) * k)$$
$$max\_bits = max(bpp + bpp\_offset, min\_rate)$$
$$wherein\ max\_bpp\_offset = 12\ bpp < 4 ? 4 : 12\ bpp$$

If the initial transmission delay mechanism is taken into account, the above process of determining the upper limit and the lower limit also needs to consider the impact of the initial transmission delay mechanism on the buffer fullness.

(3) limiting the initial target number of bits based on the determined upper limit and lower limit, to obtain the target number of bits of the current block, which can be specifically implemented as: target_bits=Clip3 (min_bits, max_bits, target_bits).

In addition, if the current block is a first-row block of the image to be processed, the parameter prediction of the first-row block is more difficult and the prediction error is transitive. Therefore, when the current block is the first-row block, the quality of the current block can be improved by introducing the first-row quality improvement parameter, this process is mainly implemented by reducing the quantization parameter of the first-row block.

Specifically, in the above process of determining the target number of bits, the following can be implemented:

if the current block is the first-row block, increasing the bpp by 2.

For all first-row blocks in the image to be processed, the adjustment of the bpp parameter can be achieved as follows: taking an increasing amount of bpp of the image block in the first row as bpp_delta_row, and from the first block to the last block in the first row, bpp_delta_row gradually decreases from 2.5 to 0.5.

When the current block is the first-row block, in the process of limiting the initial target number of bits according to the buffer status and block-grade complexity level to determine the target number of bits, the image quality of the current block can be improved as follows: after limiting the target number of bits according to the buffer status and complexity, if the current block is the first-row block of the slice and target_bits <7, wherein 7 is a preset empirical threshold, then increasing target_bits, and the increased target_bits must be within the given range. The specific implementation can be target_bits+=Clip3(0, 2, 7−target_bits).

When the current block is the first-row block, the quality of the current block can also be improved by determining the upper limit using the following formula: max_bits=max (bpp+bpp_offset, min_rate), bpp_offset=max(bpp_offset, −1), wherein 1 is a preset empirical parameter.

$$min\_bits = max((1.5-10*fullness)*bpp, 0.9*bpp/max\_lossless\_bits*min(lossless\_bits[blk\_comp\_level], max\_lossless\_bits))$$
$$min\_rate = max(min\_rate, bpp - (1 + sample\_rate) * k - 2 * (fullness - 0.85)))$$

It is understandable that when the current block is the first-row block, improving the quality of the current block by using the first-row quality improvement parameter can also be performed only when a certain condition is met. For example, the first-row quality improvement is performed only when the complexity level of the current block is low.

In addition, when the current block is the first-column block of the image to be processed, the quality of the current block can also be improved by introducing the first-column quality improvement parameter. This process is implemented mainly by reducing the quantization parameter of the first-column block.

If the current block is the first-column block, the bpp is increased by 2.

For all the first-column blocks in the image to be processed, the adjustment of the bpp parameter can be implemented as follows: taking the increasing amount of bpp of the image blocks in the first column as bpp_delta_col, and from the first block to the last block in the first row, bpp_delta_col gradually decreases from 2.5 to 0.5.

When the current block is the first-column block, in the process of limiting the initial target number of bits according to the buffer status and block-grade complexity level to determine the target number of bits, the image quality of the current block can be improved as follows: after limiting the target number of bits according to the buffer status and complexity, if the current block is the first-column block of the slice and target_bits <7, wherein 7 is a preset empirical threshold, then increasing target_bits, and the increased target_bits must be within a given range. The specific implementation can be:

$$target\_bits \mathrel{+}= Clip3(0, 2, 7 - target\_bits).$$

When the current block is the first-column block, the quality of the current block can also be improved by determining the upper limit using the following formula: max_bits=max(bpp+bpp_offset, min_rate), wherein 1 is a preset empirical parameter.

It is understandable that when the current block is the first-column block, improving the quality of the current block by using the first-column quality improvement parameter can also be performed only when a certain condition is met. For example, the first-column quality improvement is performed only when the complexity level of the current block is high.

Step S704, determining a quantization parameter of the current block.

In this step, determining the quantization parameter of the current block is implemented as follows:

(1) calculating a reference quantization parameter ref_qp:

$$ref\_qp = (lossless\_bits[blk\_comp\_level] \; target\_bits/(1 + sample\_rate)) * p$$

wherein, a default value of p is 8.

(2) calculating component quantization parameters. Taking the image to be processed as a YUV image as an example, the process is to calculate the quantization parameter of each of YUV channels, which can be implemented as follows:

calculating a bias: bias=bias_init*format_bias; wherein bias_init and format_bias are preset values, wherein bias_init is shown in Table 3 below and format_bias is shown in Table 1 above.

calculating a luminance channel quantization parameter:

$$luma\_qp = Clip3(0, luma\_max\_qp, ref\_qp \; sample\_rate * bias).$$

calculating a chrominance channel quantization parameter:

$$chroma\_qp = Clip3(0, chroma\_max\_qp, ref\_qp + bias).$$

Wherein bias_init is shown in Table 3, and format_bias is shown in Table 2.

TABLE 3

| comp_level[0] | | | 0 | | |
|---|---|---|---|---|---|
| comp_level[1] | 0 | 1 | 2 | 3 | 4 |
| bias_init | 3.0 | 3.0 | 3.5 | 4.0 | 4.5 |
| comp_level[0] | | | 1 | | |
| comp_level[1] | 0 | 1 | 2 | 3 | 4 |
| bias_init | 3.0 | 3.0 | 3.0 | 3.5 | 4.0 |
| comp_level[0] | | | 2 | | |
| comp_level[1] | 0 | 1 | 2 | 3 | 4 |
| bias_init | 2.0 | 3.0 | 3.0 | 3.0 | 3.5 |
| comp_level[0] | | | 3 | | |
| comp_level[1] | | | | | |
| bias_init | 1.0 | 2.0 | 3.0 | 3.0 | 3.0 |
| comp_level[0] | | | 4 | | |
| comp_level[1] | 0 | 1 | 2 | 3 | 4 |
| bias_init | 0.0 | 1.0 | 2.0 | 3.0 | 3.0 |

In the above Table 3, comp_level[0] represents a luminance component, and comp_level[1] represents a chrominance component.

In addition, for the YUV420 format image, two YUV420 images can be spliced into one YUV444 image for processing. At this time, the luminance component complexity level can be determined by a weighted value of the luminance components of the two YUV420 images:

$$comp\_level[0] = m * y1\_comp\_level + (1 - m) * y2\_comp\_level,$$

$$wherein \; 0 <= m <= 1.$$

It is understandable that the above luminance component complexity level may also take a maximum or minimum value of the luminance components of the two YUV420 images, and the present application does not limit to this.

Step S705, performing video en/decoding on the current block based on the quantization parameter.

In one embodiment, the video codec performs en/decoding on the current block based on the quantization parameter of the current block. It is understandable that, when encoding, the video encoder may encode the channel-grade complexity level of the current block into the code stream, or encode the quantization parameter of the current block into the code stream. Accordingly, the decoding end acquires the channel-grade complexity level in the code stream to calculate the quantization parameter for decoding, or the decoding end acquires the quantization parameter in the code stream for decoding. Of course, the video encoder may also encode both of the above two types of information into the code stream.

In addition, in the process of determining the quantization parameter, each channel component of the current block can also independently determine the above parameters such as the number of bits for same-level average lossless encoding, the number of bits for average lossless encoding and the target number of bits, and the above process can be implemented as follows:

determining the number of bits for average lossless encoding for each channel component of the current block and the number of bits for same-level average lossless encoding for each channel component of the current block, specifically:

(1) determining the number of bits for lossless encoding pred_lossless_bits[i] for each channel component of the current block:

$$pred\_lossless\_bits[i] = (cu\_bits[i]/(width[i] \times height[i]) + qp[i]/a[i]$$

When the buffer is full and in the residual skip mode, pred_lossless_bits[i]=bpc[i]+c[i];

Wherein, i is the number of channels of the current block, which indicates the actual number of bits for encoding of the current channel; width and height respectively represent the width and height of the current channel encoding unit, and qp represents the quantization parameter of the current channel.

(2) determining the number of bits for same-level average lossless encoding for each channel component: lossless_bits[i][comp_level[i]]:

$$lossless\_bits[i][comp\_level[i]] =$$
$$lossless\_bits[i][comp\_level[i]] * (1 - d[i]) + pred\_lossless\_bits[i] * d[i]$$

wherein, lossless_bits[i][comp_level[i]] is the number of bits for same-level average lossless encoding of an encoded channel with the same complexity level as the current channel, and d[i] is the update rate.

(3) determining the number of bits for average lossless encoding avg_lossless_bits:

$$avg\_lossless\_bits[i] =$$
$$avg\_lossless\_bits[i] * (1 - e[i]) + pred\_lossless\_bits[i] * e[i]$$

determining the target number of bits for each channel component of the current block, which can be implemented as follows:

(1) determining the quality ratio quality_ratio:

Implementation 1: determining the quality ratio quality_ratio[i] of each channel component of the current block:

$$quality\_ratio[i] = bpp[i]/(ave\_lossless\_bits[i] - comp\_offset[i])$$

Implementation 2: The calculation of quality_ratio still uses a cu (Coding Unit) level, and the calculation process is the same as the above step S7031, but the above ave_lossless_bits[i] needs to be combined into a cu-level variable (2) determining the target number of bits target_bits:

$$target\_bits[i] = quality\_ratio[i] *$$  Implementation 1
$$(lossless\_bits[i][comp\_level[i]] - comp\_offset[i])$$

wherein, for the subsequent step (3), it is necessary to combine target_bits and lossless_bits from a cb level (channel level) to the cu level.

Implementation 2 corresponds to Implementation 2 in step (1). At this time, the calculation method of the target number of bits target_bits is the same as in the above step S703, and the obtained target_bits is already the cu-level variable. For the subsequent step (3), it is also necessary to combine the cb-level lossless_bits[i] to the cu-level.

(3) limiting the target number of bits according to the buffer status and complexity, which is the same as step S703 above, which will not be described again here.

Determining the quantization parameter of each channel component of the current block, which can be implemented as follows:

Implementation 1: determining the quantization parameter of each channel component:

$$qp[i] = (lossless\_bits[i][comp\_level[i]] - target\_bits[i]) * p[i]$$

If step (3) takes effect, that is, the upper and lower limits have a limiting effect, and the value of target_bits is modified to the upper limit or lower limit, then according to the ratio of target_bits [i] obtained in steps (1) to (2), reallocate target_bits to obtain a new target_bits [i]; if target_bits is not modified by step (3), the value of target_bits[i] will not change.

Implementation 2: if the target_bits have not been separated before, separating the target_bits according to the complexity level.

Implementation 3: all variables before this step are at the cu level, at this time, separating the reference quantization parameter ref_qp according to the complexity, and using the qp obtained after separation as a final luminance and chrominance qp.

In the above process, assuming that the cu variable to be separated is temp, separating the cu-level variable into the cb-level variable can be implemented as follows:

$$temp[i] = temp * k[i], \text{ wherein } 0 <= k[i] <= 1 \text{ and } \sum k[i] = 1.$$

Wherein, the value of k is related to the complexity. One implementation of k is k[i]: comp_level[i]/Σcomp_level[i]. Another implementation is to preset a table, and a table index value is the complexity level.

In addition, the cb-level variables need to be combined into cu-level variables. Assuming that the cu variable to be combined is temp[i], the specific combining process is:

$$temp = (temp[0] + temp[1] * sample\_rate)/(1 + sample\_rate)$$

In another specific embodiment of the present application, the code control parameter in the above video image decoding method or encoding method may also be fixed-pointed, which may be specifically achieved through the following process:

S1: code control initialization

Initializing the code control parameters, WarmUp, End-ControlLine, EndControlBlocks, EndControlBegin, EndTargetFullness and MaxBufferSize, before decoding each video slice. The specific initialization can be as follows:

WarmUp[0] = WarmUp[1] = WarmUp[2] = WarmUp[3] = WarmUp[4] = 4
ComplexityShift = 7
InfoRatioShift = 7
BppShift = 7
FullnessShift = 7
AvgComplexityShift = 14
ChromaSampleRateShift = 1
K1Shift = 10
K2 = 160
K2Shift = 4
K3 = 32
K3Shift = 4
K4 = 1083
K4Shift = 7
BiasShift = 7
DelayBits = (TargetBpp << 1) × TransmissionDelayCu
EndDecreaseBits = ReBufferSize − DelayBits + 3 × MuxWordSize
EndControlBlocks = (EndDecreaseBits + (1<< DecreaseStepLog2) − 1) >> DecreaseStepLog2
EndControlBegin = SliceWidthInCu × SliceHeightInCu − EndControlBlocks
EndTargetFullness = (DelayBits − (3 × MuxWordSize − 1)) × 3 / 4
RemainBlksLog2 = SliceCuNumMaxBit
MaxBufferSize = ReBufferSize The above parameters are all intermediate parameters of the code control initialization process, which are configured to realize the fixed-point of code control parameters. Wherein, WarmUp[i](0<=i<=4) represents update rate parameters of several starting blocks, which are configured to update the number of bits for same-level lossless encoding AdjComplexity; ComplexityShift represents the number of shift bits for fixed-point of the complexity related operation; InfoRatioShift represents the number of shift bits for fixed-point of the quality ratio related operation; BppShift represents the number of shift bits for fixed-point of the bpp related operation; FullnessShift represents the number of shift bits for fixed-point of the fullness related operation; AvgComplexityShift represents the number of shift bits for fixed-point of the number of bits for average lossless encoding related operation; ChromaSampleRateShift represents the number of shift bits for fixed-point of the sampling rate related operation; K1Shift represents the number of shift bits for fixed-point of the k1 (see Table 4) related operation; K2Shift represents the number of shift bits for fixed-point of the k2 related operation; K3Shift represents the number of shift bits for fixed-point of the k3 related operation; K4Shift represents the number of shift bits for fixed-point of the k4 related operation; BiasShift indicates the number of shift bits for fixed-point of Bias-related operations; K2, K3, and K4 are fixed empirical values configured in the code control algorithm; DelayBits represents the number of bits for delaying; TargetBpp represents the target bpp, which is configured externally; TransmissionDelayCu represents the number of cus of initial transmission delay; EndDecrease- Bits represents the number of bits that need to be reduced at the end of the slice due to the initial delay function; RcBufferSize represents the buffer size considered by the code control; MuxWordSize represents the number of bits of header information required for substream parallel function; EndControlBlocks represents the number of blocks that need to operate on the maximum value of the buffer at the end of the slice due to the initial transmission delay; DecreaseStepLog2 represents a logarithmic value specifying the decreased step size of MaxBufferSize configured by the code rate control module on each control block at the end of slice, and its value is in the code stream header; EndControlBegin represents an index of the block that starts to be controlled at the end of the slice; SliceWidthInCu represents how many cu widths there are in the slice width; SliceHeightInCu represents how many cu heights there are in the slice height; EndTargetFullness represents a target fullness at the end of the slice; RemainBlksLog2 represents the highest binary digit of the total number of encoding units in a stripe; MaxBufferSize represents the maximum value of the buffer.

Searching for table 1 according to BitDepth [0] (indicating the bpc of the Y channel), ImageFormat to obtain initialization values of AdjComplexity (the number of bits for same-level lossless encoding), AvgComplexity (the number of bits for average lossless encoding), ComplexityOffset (the bias value for complexity calculation), MaxComp (the maximum number of bits for lossless encoding), and K1 (the empirical value).

TABLE 4

| | BitDepth[0] | | | | | | | | | |
| | 8 bit | | 10 bit | | 12 bit | | 14 bit | | 16 bit | |
| ImageFormat | RGB444 | others | RGB444 | others | RGB444 | others | RGB444 | others | RGB444 | others |
|---|---|---|---|---|---|---|---|---|---|---|
| AdjComplexity[0] | 64 | 0 | 192 | 128 | 256 | 192 | 320 | 256 | 320 | 320 |
| AdjComplexity[1] | 166 | 102 | 320 | 256 | 410 | 346 | 499 | 435 | 525 | 525 |
| AdjComplexity[2] | 269 | 205 | 448 | 384 | 563 | 499 | 678 | 614 | 730 | 730 |
| AdjComplexity[3] | 371 | 307 | 576 | 512 | 717 | 653 | 858 | 794 | 934 | 934 |
| AdjComplexity[4] | 574 | 510 | 704 | 640 | 870 | 806 | 1037 | 973 | 1139 | 1139 |
| AvgComplexity | 704 | 640 | 896 | 832 | 1024 | 960 | 1152 | 1088 | 1216 | 1216 |
| ComplexityOffset | 64 | 0 | 320 | 256 | 448 | 384 | 640 | 576 | 768 | 768 |
| MaxComp | 1050 | 922 | 1152 | 1088 | 1280 | 1216 | 1536 | 1472 | 1728 | 1728 |
| K1 | 112 | 128 | 102 | 108 | 92 | 97 | 77 | 80 | 68 | 68 |

Table 4 above shows correspondences among AdjComplexity, AvgComplexity, ComplexityOffset, MaxComp, K1, and BitDepth[0], ImageFormat.

According to ImageFormat (image format), the initialization values of ChromaSampleRate (sampling rate), InvElem (a multiplier required for division related to removing the sampling rate), InvElemShift (a shift value required for division related to removing the sampling rate) and Format Bias (a bias value for qp for different image formats) can be obtained from Table 5 below.

TABLE 5

| ImageFormat | YUV400 | YUV420 | YUV422 | RGB444 | YUV444 |
|---|---|---|---|---|---|
| ChromaSampleRate | 0 | 1 | 2 | 4 | 4 |
| InvElem | 1 | 85 | 1 | 85 | 85 |
| InvElemShift | 0 | 7 | 1 | 8 | 8 |
| FormatBias | 0 | 114 | 85 | 128 | 57 |

Table 5 above shows correspondences among ChromaSampleRate, InvElem, InvElemShift, FormatBias, and ImageFormat.

S2: determining the quantization parameter. This step can be implemented as follows:

S21: calculating the quantization parameter MasterQp of the encoding unit according to the luminance complexity level ComplexityLevel [0] and the chrominance complexity level ComplexityLevel[1] of the current encoding unit.

S22: calculating a quantization parameter Qp[0] of a luminance coding block and a quantization parameter Qp[1] of a chrominance coding block of the current encoding unit based on MasterQp.

Wherein calculating the quantization parameter MasterQp of the encoding unit according to the luminance complexity level ComplexityLevel [0] and the chrominance complexity level ComplexityLevel[1] of the current encoding unit can be implemented as follows:

```
bppAdj = (EndTargetFullness − (BitsRecord − ((TargetBpp << 1) × (CurrBlocks − 1))) << BppShift
bppAdj = bppAdj >= 0 ? bppAdj >> (5 + RemainBlksLog2) : −((−bppAdj) >> (5 + RemainBlksLog2))
bppAdj = Clip3((−(4 << BppShift)), (12 << BppShift), bppAdj)
bpp = (bpp << BppShift >> 4) + bppAdj
maxComp = (MaxComp <<− ComplexityShift) >> 7
complexityOffset = (ComplexityOffset << ComplexityShift) >> 7
shiftCur = ReBufferSizeMaxBit − 5
tmp = (MaxBufferSize + (1 << shiftCur >> 1)) >> shiftCur
tmp = (BitsRecord − (TargerBpp << 1) × (CurrBlocks − 1)) × InverseTable[tmp − 1]
shiftCur = shiftCur + 10
fullness = (tmp + (1 << (shiftCur − FullnessShift − 1))) >> (shiftCur − FullnessShift)
complexityOffset = complexityOffset + ((34) << ComplexityShift) >> 7) − (((43 × bpp) >> 7) <<
ComplexityShift >> BppShift)
complexityOffset = max(complexityOffset, 0)
tmp = (AvgComplexity >> (AvgComplexity − ComplexityShift)) − complexityOffset
tmp = tmp >> (ComplexityShift − 2)
tmp = Clip3 (1, 32, (tmp + 1) >> 1)
infoRatio = bpp − InverseTable[tmp − 1]
shiftCur = BppShift + 9 − InfoRatioShift
infoRatio = (infoRatio + (1 << shiftCur >> 1)) >> shiftCur
if(ImageFormat == YUV444 || ImageFormat == RGB444){
infoRatio = Clip3(0, ((77 × (2 + ChromaSampleRate)) << InfoRatioShift) >> 7 >> ChromaSampleRateShift),
infoRatio)
}
CuComplexityLevel = ((ComplexityLevel[0] + ComplexityLevel[1] × ChromaSampleRate) × InvElem + ((1 <<
InvElemShift) >> 1))>> InvElemShift
B = AdjComplexity[CuComplexityLevel]
relativeComplexity = Clip3(0, ((320 << ComplexityShift) >> 7), maxComp − B)
minRate1 = (K1 × bpp + ((1 << K1Shift) >> 1)) >> K1Shift
minRate1 = (minRate1 × MinimaxComp, B) + ((1 << BppShift) >> 1)) >> BppShift
minRate2 = K2 × fullness
shiftCur = K2Shift + FullnessShift
minRate2 = ((minRate2 << 7) + ((1 <<− shiftCur) >> 1)) >> shiftCur
minRate2 = (192 − minRate2) × bpp
```

```
shiftCur = 7 + BppShift
minRate2 = (((minRate2 << ComplexityShift) + ((1 << shiftCur) >> 1)) >> shiftCur
minRate3 = fullness – (109 << FullnessShift >> 7)
minRate3 = (minRate3 × K3 + ((1 << K3Shift) >> 1)) >> K3Shift
minRate3 = ((minRate3 << ComplexityShift) + ((1 << FullnessShift) >> 1)) >> FullnessShift
minRate3 = (((bpp << ComplexityShift) + ((1 << BppShift) >> 1)) >> BppShift) – minRate3
minRate3 = minRate3 – (relativeComplexity × ((1 << ChromaSampleRateShift) + ChromaSampleRate)) >>
ChromaSampleRateShift
minRate = Max(minRate1, minRate2)
minRate = Max(minRate, minRate3)
bppOffset1 = K4 × fullness
shiftCur = K4Shift + FullnessShift
bppOffset1 = ((bppOffset1 << ComplexityShift) + ((1 << shiffCur) >> 1)) >> shiftCur
bppOffset1 = ((1121 << ComplexityShift) >> 7) – bppOffset1
tmp = ((1 << ChromaSampleRateShift) + ChromaSampleRate) × relativeComplexity
tmp = (tmp + ((1 << ChromaSampleRateShift) >> 1)) >> ChromaSampleRateShift
bppOffset1 = bppOffset1 – tmp
tmp = Max((12 << BppShift) – bpp, (4 << BppShift))
maxBppOffset = (tmp << ComplexityShift) >> BppShift
bppOffset2 = maxBppOffset – relativeComplexity
bppOffset3 = ((1554 << ComplexityShift) >> 7)
tmp = 457 × fullness
shiftCur = 5 + FullnessShift
tmp = ((tmp << ComplexityShift) + ((1 << shiftCur) >> 1)) >> shiftCur
bppOffset3 = bppOffset3 – tmp
bppOffset = Min(bppOffset1, bppOffset2)
bppOffset = Min(bppOffset, bppOffset3)
maxRate = Max (((bpp << ComplexityShift) >> BppShift) + bppOffset, minRate)
targetRate = infoRatio × Max(0, B – complexityOffset)
targetRate = (targetRate – ((1 << InfoRatioShift) >> 1)) >> InfoRatioShift
targetRate = Clip3(minRate, maxRate, targetRate)
tmp = (targetRate × InvElem + ((1 << InvElemShift) >> 1)) >> InvElemShift
MasterOp = (B – tmp) << 3
```

Wherein bppAdj represents an adjustment value of bpp; BitsRecord represents the total number of bits currently en/decoded; CurrBlocks represents the number of blocks currently en/decoded; maxComp represents a value that needs to be transformed when MaxComp is configuredfor code control fixed-pointed; complexityOffset represents a value that needs to be transformed when ComplexityOffset is configured for code control fixed-pointed; RcBufferSizeMaxBit represents the code stream buffer size. The value of RcBufferSize is equal to the value of rc_buffer_size, the value of RcBufferSizeMaxBit represents the highest binary digit of RcBufferSize; shiftCur represents the current shift value; tmp represents an intermediate variable generated in the process of code control fixed-point; fullness represents fullness; infoRatio represents the quality ratio; relativeComplexity represents the number of bits for relative lossless encoding; minRate1, minRate2 and minRate13 represent intermediate variables for calculating minRate; minRate represents a lower limit of targetRate; targetRate represents the target number of bits; bppOffset1, bppOffset2 and bppOffset3 represent intermediate variables for calculating bppOffset; bppOffset represents an offset value of bpp; maxRate represents an upper limit of targetRate; InverseTable is one preset table, a definition thereof is: InverseTable={1024, 512, 341, 256, 205, 171, 146, 128, 114, 102, 93, 85, 79, 73, 68, 64, 60, 57, 54, 51, 49, 47, 45, 43, 41, 39, 38, 37, 35, 34, 33, 32}.

Calculating the quantization parameter Qp[0] of the luminance coding block and the quantization parameter Qp[1] of the chrominance coding block of the current encoding unit according to MasterQp can be implemented as follows:

BiasInit is obtained by searching Table 6 below according to the luminance complexity level ComplexityLevel[0] and the chrominance complexity level ComplexityLevel[1] of the current encoding unit;

TABLE 6

Definition of BiasInit

| | | | | | |
|---|---|---|---|---|---|
| ComplexityLevel[0] | | | 0 | | |
| ComplexityLevel[1] | 0 | 1 | 2 | 3 | 4 |
| BiasInit | 6 | 6 | 7 | 8 | 9 |
| ComplexityLevel[0] | | | 1 | | |
| ComplexityLevel[1] | 0 | 1 | 2 | 3 | 4 |
| BiasInit | 6 | 6 | 6 | 7 | 8 |
| ComplexityLevel[0] | | | 2 | | |
| ComplexityLevel[1] | 0 | 1 | 2 | 3 | 4 |
| BiasInit | 4 | 6 | 6 | 6 | 7 |
| ComplexityLevel[0] | | | 3 | | |
| ComplexityLevel[1] | | | | | |
| BiasInit | 2 | 4 | 6 | 6 | 6 |
| ComplexityLevel[0] | | | 4 | | |
| ComplexityLevel[1] | 0 | 1 | 2 | 3 | 4 |
| BiasInit | 0 | 2 | 4 | 6 | 6 |

Calculating the luminance quantization parameter Qp[0] and the chrominance quantization parameters Qp[1] and Qp[2] can be specifically implemented as follows:

```
Bias = (BiasInit × FormatBias) >> (8 – BiasShift)
tmp = ChromaSampleRate × Bias
shiftCur = ChromaSampleRateShift + BiasShift
tmp = (((tmp << ComplexityShift) + ((1 << shiftCur) >> 1)) >> shiftCur
Qp[0] = Clip3(0, MaxQp[0], (MasterQp – tmp) >> ComplexityShift)
tmp = (Bias << ComplexityShift) >> BiasShift
Qp[1] = Clip3(0, MaxQp[1], (MasterQp + tmp) >> ComplexityShift)
Qp[2] = Qp[1]
```

S3: updating code control parameter

Inputting an actual number of bits CuBits of the current encoding unit, the luminance quantization parameter Qp[0], the chrominance quantization parameter Qp[1] and the complexity CuComplexityLevel of the current encoding unit, and calculating the actual number of bits for lossless encoding compCur of the current block according to the actual coding overhead and quantization parameters can be implemented as follows:

```
CuBitsAccum = CuBitsAccum + CuBits
SSHeaderNum = CuBitsAccum / 510
CuBitsAccum = CuBitsAccum % 510
CuBits = CuBits + (SSHeaderNum << 1) /* considering the number of bits of substream index */
rateCur = (CuBits << ComplexityShift) >> 5
compCur = rateCur + ((Qp[0] << ComplexityShift) >> 3 + ((ChromaSampleRate × Qp[1]) <<
ComplexityShift) >> 3) >> ChromaSampleRateShift)
compCur = (compCur × InvElem + ((1 << InvElemShift) >> 1)) >> InvElemShift
```

According to the actual number of bits for lossless encoding compCur of the current block, updating the code control parameters AvgComplexity and AdjComplexity can be implemented as follows:

```
AvgComplexity = AvgComplexity × 1014 + (compCur << AvgComplexityShift >>ComplexityShift) × 10
AvgComplexity = (AvgComplexity + 512) >> 10
updateRate = WarmUp[CuComplexityLevel] + 2
WarmUp[CuComplexityLevel] = WarmUp[CuComplexityLevel] > 0 ? WarmUp[CuComplexityLevel] − 1 : 0
AdjComplexity[CuComplexityLevel] = (AdjComplexity[CuComplexityLevel] × (8 − updateRate) + compCur ×
updateRate + 4) >> 3
```

Updating the code control parameter MaxBufferSize can be implemented as follows:

```
if (CurrBlocks >= EndControlBegin){
MaxBufferSize = MaxBufferSize − (1 << DecreaseStepLog2)
RemainBlksLog2 = (RemainBlksLog2 > 4 && !((SliceWidthInCu × SliceHeightInCu − CurBlocks) & (1 <<
RemainBlksLog2))) ? RemainBlksLog2 − 1 : RemainBlksLog2
}
```

It should be noted that all of solutions without special explanations among the above solutions can be performed at either the decoding side or the encoding side.

It should be noted that, in the absence of conflict, part or all of the contents of any of the above embodiments can constitute a new embodiment.

An embodiment of the present application provides a video en/decoding device, which can be a video codec, a video encoder, or a video decoder. Specifically, the video en/decoding device is configured to execute the steps executed by the video codec in the above video image decoding method or encoding method. The video en/decoding device provided by the embodiment of the present application may include modules corresponding to the respective steps.

The embodiment of the present application can divide the video en/decoding device into functional modules according to the above method embodiments. For example, division of each functional module can correspond to each function, or two or more functions can be integrated into one processing module. The above integrated modules can be realized in the form of hardware or software functional modules. The division of modules in the embodiment of the present application is schematic, only a division of functions for logical, and there may be another division method in actual implementation.

In the case of defining each functional module corresponding to each function, a possible schematic diagram of a structure of a video en/decoding device involved in the above embodiment is shown in FIG. 11. As shown in FIG. 11, the video en/decoding device 1100 includes a complexity level determination module 1101, a code control parameter determination module 1102, a quantization parameter determination module 1103 and an en/decoding module 1104.

The complexity level determination module 1101 is configured for acquiring at least two channel-grade complexity levels of a current block in an image to be processed, and determining a block-grade complexity level of the current block according to the at least two channel-grade complexity levels: wherein a channel-grade complexity level is determined by a complexity degree of a channel-grade texture of the current block.

The code control parameter determination module 1102 is configured for determining a target number of bits of the current block according to a code control parameter, wherein the code control parameter includes the block-grade complexity level of the current block.

The quantization parameter determination module 1103 is configured for determining a quantization parameter of the current block based on the target number of bits.

The en/decoding module 1104 is configured for performing en/decoding on the current block based on the quantization parameter.

In one example, the code control parameter includes the number of bits for same-level average lossless encoding, the number of bits for average lossless encoding, and a buffer fullness of the code stream; the code control parameter determination module is specifically configured for determining the number of bits for same-level average lossless encoding and the number of bits for average lossless encoding; determining an initial target number of bits based on the number of bits for same-level average lossless encoding and the number of bits for average lossless encoding; determining the target number of bits of the current block based on the buffer fullness of the code stream, the block-grade complexity level of the current block, and the initial target number of bits: wherein, the number of bits for same-level average lossless encoding is an average value of predicted values of the numbers of bits required for lossless encoding of the current block and multiple en/decoded image blocks, and the multiple en/decoded image blocks have the same complexity levels as the current block: the number of bits for average lossless encoding is an average value of predicted values of the numbers of bits required for lossless encoding of the current block and all of the en/decoded image blocks: the buffer fullness of the code stream is configured to characterize a fullness of a buffer, and the buffer is configured to store a code stream of an image to be processed.

In one example, the above code control parameter determination module is specifically configured for determining the number of bits for same-level average lossless encoding and the number of bits for average lossless encoding: determining the number of bits for lossless encoding of the current block, wherein the number of bits for lossless encoding is a predicted value of the number of bits required for lossless coding of the current block; updating the number of bits for same-level average lossless encoding of the current block according to the number of bits for lossless encoding of the current block and multiple historical numbers of bits for same-level average lossless encoding: wherein the historical number of bits for same-level average lossless encoding is the number of bits for same-level average lossless encoding of the en/decoded image block with the same block-grade complexity level as that of the current block; updating the number of bits for average lossless encoding of the current block according to the number of bits for lossless encoding of the current block and all historical numbers of bits for average lossless encoding: wherein the historical number of bits for average lossless encoding is the number of bits for average lossless encoding of the en/decoded image block.

In one possible implementation, the current block is a first-row block of the image to be processed, and the code control parameter includes a first-row quality improvement parameter; the code control parameter determination module is specifically configured for determining the target number of bits of the current block according to the code control parameter, which further includes: adjusting the target number of bits of the current block according to the first-row quality improvement parameter to reduce the quantization parameter of the current block.

In one possible implementation, the current block is a first-column block of the image to be processed, and the code control parameter includes a first-column quality improvement parameter; the code control parameter determination module is specifically configured for determining the target number of bits of the current block according to the code control parameter, which further includes: adjusting the target number of bits of the current block according to the first-row quality improvement parameter to reduce the quantization parameter of the current block.

In one example, the complexity level determination module is specifically configured for acquiring at least two channel-grade complexity levels of the current block in the image to be processed, at the encoding end, acquiring the channel-grade texture information of the current block, and determining the channel-grade complexity level of the current block based on the channel-grade texture information; or at the decoding end, acquiring the channel-grade complexity levels from the code stream, wherein the code stream is an encoded code stream of the current block.

In one example, the complexity level determination module is specifically configured for acquiring the channel-grade complexity levels from the code stream by: acquiring a complexity information bit of the current block from the code stream, wherein the complexity information bit is configured to indicate channel-grade complexity levels of the current block; and determining the channel-grade complexity levels according to the complexity information bit.

In one example, the complexity level determination module is specifically configured for acquiring the channel-grade texture information of the current block, and determining the channel-grade complexity levels of the current block based on the channel-grade texture information by: taking at least one channel image block of the current block as a processing unit, and dividing the processing unit into at least two sub-units, and determining texture information of each of the sub-units; in the processing unit, determining the block-grade complexity level of the current block based on the texture information of sub-units.

In one example, the complexity level determination module is specifically configured for determining the texture information of each of the sub-units by: acquiring original pixel values of the sub-unit, original pixel values or reconstructed values of an adjacent left column to the sub-unit, and reconstructed values of an adjacent upper row to the sub-unit, and calculating horizontal texture information and vertical texture information of the sub-unit respectively; selecting a minimum value from the horizontal texture information and the vertical texture information as the texture information of the sub-unit to which the horizontal texture information and the vertical texture information correspond.

In one example, the complexity level determination module is specifically configured for in the processing unit, determining the block-grade complexity level of the current block based on the texture information of the sub-units by: classifying, in the processing unit, the texture information of each of the sub-units into a corresponding one of sub-unit complexity levels based on multiple thresholds, wherein the multiple thresholds are preset; determining the block-grade complexity level of the current block based on the sub-unit complexity levels.

In one example, the complexity level determination module is specifically configured for determining the block-grade complexity level of the current block based on the sub-unit complexity levels by: mapping each of the sub-unit complexity levels to a corresponding one of the channel-grade complexity levels according to a preset rule; and determining the block-grade complexity level of the current block based on all of the channel-grade complexity levels.

In one example, the complexity level determination module is specifically configured for mapping each of the sub-unit complexity levels to the corresponding one of the channel-grade complexity levels according to the preset rule by: determining the channel-grade complexity level based on multiple thresholds and a sum of respective sub-unit complexity levels, wherein the multiple thresholds are preset.

In one example, the complexity level determination module is specifically configured for mapping each of the sub-unit complexity levels to the corresponding one of the channel-grade complexity levels according to the preset rule by: determining an order composition of the sub-unit complexity level, and determining the corresponding one of the channel-grade complexity levels according to the order composition.

In one example, the complexity level determination module is specifically configured for determining the block-grade complexity level of the current block based on all of the channel-grade complexity levels by: taking a maximum value, a minimum value or a weighted value of channel-grade complexity levels as the block-grade complexity level of the current block; or determining the block-grade complexity level of the current block based on multiple thresholds and the sum of channel-grade complexity levels, wherein the multiple thresholds are preset.

Wherein, all the related contents of each step involved in the above method embodiment can be referred to the description of function of the functional module corresponding to the method, and are not repeated here.

Of course, the video en/decoding device provided by the embodiment of the present application includes but is not limited to the above modules, for example, the video en/decoding device may further include a storage module.

The storage module can be configured for storing the program code and data of the video en/decoding device.

An embodiment of the present application further provides an electronic apparatus, which includes the above video en/decoding device 1100, and the video en/decoding device 1100 executes any one of the above methods performed by a video codec.

An embodiment of the present application further provides a computer-readable storage medium storing a computer program thereon, which when running on a computer, causes the computer to carry out any one of the above methods performed by the video decoder.

The explanation of related contents and the description of beneficial effects of any of the computer-readable storage media provided above can refer to the above corresponding embodiments, and will not be repeated here.

An embodiment of the present application further provides a chip. The chip integrates one or more ports and a control circuit for realizing the functions of the video en/decoding device 100. Optionally, the functions supported by the chip can be referred to the above contents and will not be repeated here. Those skilled in the art can understand that all or part of the steps to realize the above embodiments can be completed by instructing related hardware through programs. The programs can be stored in a computer-readable storage medium. The storage medium mentioned above can be read-only memory, random access memory, etc. The processing unit or processor can be a central processing unit, a general processor, an application specific integrated circuit (ASIC), a microprocessor (digital signal processor, DSP), a field programmable gate array (FPGA) or other programmable logic devices, transistor logic devices, hardware components or any combination thereof.

An embodiment of the present application further provides a computer program product containing instructions, which, when running on a computer, cause the computer to carry out any one of the methods in the above embodiments. The computer program product includes one or more computer instructions. When computer program instructions are loaded and executed on a computer, the flow or function according to the embodiment of the present application is generated in whole or in part. The computer can be a general-purpose computer, a special-purpose computer, a computer network, or other programmable devices. Computer instructions can be stored in a computer-readable storage medium or transmitted from one computer-readable storage medium to another. For example, computer instructions can be transmitted from one website, computer, server or data center to another website, computer, server or data by wired (such as coaxial cable, optical fiber, digital subscriber line (DSL)) or wireless (such as infrared, wireless, microwave, etc.). The computer-readable storage medium can be any available medium that can be accessed by a computer or contain one or more data storage devices such as servers and data centers that can be integrated with medium. The available medium can be magnetic medium (e.g., floppy disk, hard disk, magnetic tape), optical medium (e.g., DVD), or semiconductor medium (e.g., SSD), etc.

It should be noted that the devices for storing computer instructions or computer programs provided by the embodiments of the present application, such as, but not limited to, the memory, computer-readable storage medium and communication chip, each of which is non-transitory.

In the above embodiments, it may be implemented in whole or in part by software, hardware, firmware or any combination thereof. When implemented in software program, it can be implemented in whole or in part in the form of a computer program product. The computer program product includes one or more computer instructions. When the computer program instructions are loaded and executed on a computer, the processes or functions described in the embodiments of the present application are generated in whole or in part. The computer may be a general purpose computer, special purpose computer, computer network, or other programmable device. The computer instructions may be stored in a computer readable storage medium or transmitted from one computer readable storage medium to another computer readable storage medium, for example, the computer instructions may be transmitted from a website, computer, server or data center to another website, computer, server, or data center by wire (such as coaxial cable, fiber optic, digital subscriber line (DSL)) or wirelessly (such as infrared, wireless, microwave, etc.). The computer-readable storage medium may be any available medium that can be accessed by a computer or a data storage device such as a server and a data center and the like that includes an integration of one or more available medium. The available medium may be magnetic medium (such as a floppy disk, a hard disk, a magnetic tape), optical medium (such as DVD), or semiconductor medium (such as Solid State Disk (SSD)) and the like.

Although the present application has been described herein in combination with various embodiments, in the process of implementing the claimed application, those skilled in the art can understand and realize other variations of the disclosed embodiments by reviewing the drawings, the disclosure and the appended claims. In the claims, the word "comprising" does not exclude other components or steps, and "a" or "an" does not exclude plural cases. A single processor or other unit can realize several functions recited in the claims. Certain measures are recorded in mutually different dependent claims, but this does not mean that these measures cannot be combined to produce good results.

Although the present application has been described in combination with specific features and embodiments thereof, it is obvious that various modifications and combinations can be made without departing from the spirit and scope of the present application. Accordingly, the description and drawings are merely illustrative of the present application as defined by the appended claims, and are deemed to cover any and all modifications, variations, combinations or equivalents within the scope of the present application. Obviously, various modifications and variations can be made to the present application by those skilled in the art without departing from the spirit and scope of the present application. Thus, if these modifications and variations of the present application fall within the scope of the claims of the present application and their technical equivalents, the present application is also intended to include these modifications and variations.

The invention claimed is:

1. A video image decoding method, comprising:

acquiring channel-grade complexity levels from a code stream, wherein the code stream is an encoded code stream of a current block, and determining a block-grade complexity level of the current block according to at least two of the channel-grade complexity levels; wherein a channel-grade complexity level is determined by a complexity degree of a channel-grade texture of the current block;

determining a target number of bits of the current block according to a code control parameter, wherein the code control parameter comprises the block-grade complexity level of the current block;

determining a quantization parameter of the current block based on the target number of bits;

performing decoding on the current block based on the quantization parameter;

wherein the code control parameter comprises the number of bits for same-level average lossless encoding, the number of bits for average lossless encoding, and a buffer fullness of the code stream;

determining the target number of bits of the current block according to the code control parameter, comprises:

determining the number of bits for same-level average lossless encoding and the number of bits for average lossless encoding;

determining an initial target number of bits based on the number of bits for same-level average lossless encoding and the number of bits for average lossless encoding;

determining the target number of bits of the current block based on the buffer fullness of the code stream, the block-grade complexity level of the current block, and the initial target number of bits;

wherein, the number of bits for same-level average lossless encoding is an average value of predicted values of numbers of bits required for lossless encoding of the current block and multiple decoded image blocks, and the multiple decoded image blocks have same complexity levels as that of the current block.

2. The video image decoding method according to claim 1, wherein the current block is a first-row block of an image to be processed, and the code control parameter comprises a first-row quality improvement parameter;

when determining the target number of bits of the current block according to the code control parameter, the method further comprises:

adjusting the target number of bits of the current block according to the first-row quality improvement parameter to reduce the quantization parameter of the current block, or, wherein the current block is a first-column block of an image to be processed, and the code control parameter comprises a first-column quality improvement parameter;

when determining the target number of bits of the current block according to the code control parameter, the method further comprises:

adjusting the target number of bits of the current block according to the first-column quality improvement parameter to reduce the quantization parameter of the current block.

3. The video image decoding method according to claim 1, wherein acquiring the channel-grade complexity levels from the code stream, comprises:

acquiring a complexity information bit of the current block from the code stream, wherein the complexity information bit is configured to indicate channel-grade complexity levels of the current block; and determining the channel-grade complexity levels according to the complexity information bit.

4. The video image decoding method according to claim 3, wherein a first bit of the complexity information bit is configured to indicate whether a current channel-grade complexity level is the same as a complexity level of a same channel of a previous image block of the current block, and a differential value between two complexity levels; if the two complexity levels are the same, the complexity information bit is 1-bit; if the two complexity levels are different, the complexity information bit is 3-bit.

5. The video image decoding method according to claim 1, wherein the number of bits for average lossless encoding is an average value of predicted values of numbers of bits required for lossless encoding of the current block and all decoded image blocks; the buffer fullness of the code stream is configured to characterize a fullness of a buffer, and the buffer is configured to store a code stream of an image to be processed.

6. The video image decoding method according to claim 5, wherein determining the number of bits for same-level average lossless encoding and the number of bits for average lossless encoding, comprises:

determining the number of bits for lossless encoding of the current block, wherein the number of bits for lossless encoding is a predicted value of the number of bits required for lossless coding of the current block;

updating the number of bits for same-level average lossless encoding of the current block according to the number of bits for lossless encoding of the current block and multiple historical numbers of bits for same-level average lossless encoding; wherein a historical number of bits for same-level average lossless encoding is the number of bits for same-level average lossless encoding of a decoded image block with a same block-grade complexity level as that of the current block;

updating the number of bits for average lossless encoding of the current block according to the number of bits for lossless encoding of the current block and all of historical numbers of bits for average lossless encoding; wherein a historical number of bits for average lossless encoding is the number of bits for average lossless encoding of a decoded image block.

7. A video image encoding method, comprising:

acquiring channel-grade texture information of a current block, and determining channel-grade complexity levels of the current block based on the channel-grade texture information, and determining a block-grade complexity level of the current block according to at least two of the channel-grade complexity levels; wherein a channel-grade complexity level is determined by a complexity degree of a channel-grade texture of the current block;

determining a target number of bits of the current block according to a code control parameter, wherein the code control parameter comprises the block-grade complexity level of the current block;

determining a quantization parameter of the current block based on the target number of bits;

performing encoding on the current block based on the quantization parameter, wherein the code control parameter comprises the number of bits for same-level average lossless encoding, the number of bits for average lossless encoding, and a buffer fullness of the code stream;

determining the target number of bits of the current block according to the code control parameter comprises:

determining the number of bits for same-level average lossless encoding and the number of bits for average lossless encoding;

determine an initial target number of bits based on the number of bits for same-level average lossless encoding and the number of bits for average lossless encoding;

determine the target number of bits of the current block based on the buffer fullness of the code stream, the block-grade complexity level of the current block, and the initial target number of bits;

wherein the number of bits for same-level average lossless encoding is an average value of predicted values of numbers of bits required for lossless encoding of the current block and multiple encoded image blocks, and the multiple encoded image blocks have same complexity levels as that of the current block.

8. The video image encoding method according to claim 7, wherein acquiring the channel-grade texture information of the current block, and determining the channel-grade complexity levels of the current block based on the channel-grade texture information, comprises:

taking at least one channel image block of the current block as a processing unit, and dividing the processing unit into at least two sub-units, and determining texture information of each of the sub-units;

determining, in the processing unit, the block-grade complexity level of the current block based on the texture information of sub-units.

9. The video image encoding method according to claim 8, wherein determining the texture information of each of the sub-units, comprises:

acquiring original pixel values in the sub-unit, original pixel values or reconstructed values of an adjacent left column to the sub-unit, and reconstructed values of an adjacent upper row to the sub-unit, and calculating horizontal texture information and vertical texture information of the sub-unit respectively;

selecting a minimum value from the horizontal texture information and the vertical texture information as the texture information of the sub-unit to which the horizontal texture information and the vertical texture information correspond.

10. The video image encoding method according to claim 8, wherein, determining, in the processing unit, the block-grade complexity level of the current block based on the texture information of the sub-units, comprises:

classifying, in the processing unit, the texture information of each of the sub-units into a corresponding one of sub-unit complexity levels based on multiple thresholds, wherein the multiple thresholds are preset;

determining the block-grade complexity level of the current block based on the sub-unit complexity levels.

11. The video image encoding method according to claim 10, wherein determining the block-grade complexity level of the current block based on the sub-unit complexity levels, comprises:

mapping each of the sub-unit complexity levels to a corresponding one of the channel-grade complexity levels according to a preset rule;

determining the block-grade complexity level of the current block based on all of the channel-grade complexity levels.

12. The video image encoding method according to claim 11, wherein mapping each of the sub-unit complexity levels to the corresponding one of the channel-grade complexity levels according to the preset rule, comprises:

determining a channel-grade complexity level based on multiple thresholds and a sum of respective sub-unit complexity levels, wherein the multiple thresholds are preset, or, wherein mapping each of the sub-unit complexity levels to the corresponding one of the channel-grade complexity levels according to the preset rule, comprises:

determining an order composition of the sub-unit complexity level, and determining the corresponding one of the channel-grade complexity levels according to the order composition.

13. The video image encoding method according to claim 7, wherein the number of bits for average lossless encoding is an average value of predicted values of numbers of bits required for lossless encoding of the current block and all encoded image blocks; the buffer fullness of the code stream is configured to characterize a fullness of the buffer, and the buffer is configured to store the code stream of the image to be processed.

14. The video image encoding method according to claim 13, wherein determining the number of bits for same-level average lossless encoding and the number of bits for average lossless encoding, comprises:

determining the number of bits for lossless encoding of the current block, wherein the number of bits for lossless encoding is a predicted value of the number of bits required for lossless coding of the current block;

updating the number of bits for same-level average lossless encoding of the current block according to the number of bits for lossless encoding of the current block and multiple historical numbers of bits for same-level average lossless encoding; wherein a historical number of bits for same-level average lossless encoding is the number of bits for same-level average lossless encoding of an encoded image block with a same block-grade complexity level as that of the current block;

updating the number of bits for average lossless encoding of the current block according to the number of bits for lossless encoding of the current block and all of historical numbers of bits for average lossless encoding; wherein a historical number of bits for average lossless encoding is the number of bits for average lossless encoding of an encoded image block.

15. The video image encoding method according to claim 7, wherein the current block is a first-row block of an image to be processed, and the code control parameter comprises a first-row quality improvement parameter;

when determining the target number of bits of the current block according to the code control parameter, the method further comprises:

adjusting the target number of bits of the current block according to the first-row quality improvement parameter to reduce the quantization parameter of the current block, or, wherein the current block is a first-column block of an image to be processed, and the code control parameter comprises a first-column quality improvement parameter;

when determining the target number of bits of the current block according to the code control parameter, the method further comprises:

adjusting the target number of bits of the current block according to the first-column quality improvement parameter to reduce the quantization parameter of the current block.

16. A video decoder comprising a processor and a memory; wherein the memory is configured to store computer-executed instructions, and when the video decoder runs, the processor executes the computer-executed instructions stored in the memory, so that the video decoder executes the method according to claim 1.

17. A video encoder, comprising a processor and a memory; wherein the memory is configured to store computer-executed instructions, and when the video encoder runs, the processor executes the computer-executed instructions stored in the memory, so that the video encoder executes the method according to claim 7.

18. A non-transitory computer-readable storage medium having a program stored therein, wherein the program, when runs on a computer, causes the computer to carry out the method according to claim 1.

\* \* \* \* \*